(12) United States Patent  (10) Patent No.: US 8,527,622 B2
Moreira Sa de Souza  (45) Date of Patent: Sep. 3, 2013

(54) FAULT TOLERANCE FRAMEWORK FOR NETWORKS OF NODES

(75) Inventor: Luciana Moreira Sa de Souza, Karlsruhe (DE)

(73) Assignee: SAP AG, Walldorf (DE)

( * ) Notice: Subject to any disclaimer, the term of this patent is extended or adjusted under 35 U.S.C. 154(b) by 402 days.

(21) Appl. No.: 11/871,616

(22) Filed: Oct. 12, 2007

(65) Prior Publication Data

US 2009/0097397 A1  Apr. 16, 2009

(51) Int. Cl.
 *G06F 15/16* (2006.01)
(52) U.S. Cl.
 USPC ............ 709/224; 709/223; 709/230; 714/13
(58) Field of Classification Search
 USPC ............................ 709/223, 224, 230; 714/13
 See application file for complete search history.

(56) References Cited

U.S. PATENT DOCUMENTS

| | | | |
|---|---|---|---|
| 5,805,820 A | | 9/1998 | Bellovin et al. |
| 5,991,806 A | * | 11/1999 | McHann, Jr. ................. 709/224 |
| 6,009,431 A | * | 12/1999 | Anger et al. ..................... 707/10 |
| 6,016,499 A | | 1/2000 | Ferguson |
| 6,138,162 A | | 10/2000 | Pistriotto et al. |
| 6,167,438 A | | 12/2000 | Yates et al. |
| 6,178,173 B1 | | 1/2001 | Mundwiler et al. |
| 6,189,038 B1 | | 2/2001 | Thompson et al. |
| 6,226,788 B1 | | 5/2001 | Schoening et al. |
| 6,256,739 B1 | | 7/2001 | Skopp et al. |
| 6,292,856 B1 | | 9/2001 | Marcotte |
| 6,363,411 B1 | | 3/2002 | Dugan et al. |
| 6,378,128 B1 | | 4/2002 | Edelstein et al. |
| 6,460,082 B1 | | 10/2002 | Lumelsky et al. |
| 6,480,977 B1 | | 11/2002 | Apisdorf et al. |
| 6,567,411 B2 | * | 5/2003 | Dahlen ......................... 370/401 |
| 6,643,669 B1 | | 11/2003 | Novak et al. |

(Continued)

FOREIGN PATENT DOCUMENTS

| | | |
|---|---|---|
| CN | 1620653 A | 5/2005 |
| EP | 0697654 A1 | 2/1996 |

(Continued)

OTHER PUBLICATIONS

Foster, I. et al., "The Open Grid Services Architecture, Version 1.0", Informational Document, Global Grid Forum (Jan. 29, 2005), pp. 1-62.

(Continued)

*Primary Examiner* — Thomas Dailey
(74) *Attorney, Agent, or Firm* — Brake Hughes Bellermann LLP

(57) ABSTRACT

In some implementations, a first message handler may be configured to receive first network-related data associated with a first network of nodes, the first network of nodes using a first communications protocol. A second message handler may be configured to receive second network-related data associated with a second network of nodes, the second network of nodes using a second communications protocol. A message transport system may be configured to receive the first network-related data and the second network-related data and further configured to route the first network-related data and the second network-related data in a common protocol, and a fault manager may be configured to receive the network-related data in the common protocol and configured to determine a fault associated with an operation of one or more of the first network of nodes and the second network of nodes, based on the network-related data in the common protocol.

21 Claims, 5 Drawing Sheets

(56) References Cited

U.S. PATENT DOCUMENTS

| | | |
|---|---|---|
| 6,686,838 B1 | 2/2004 | Rezvani et al. |
| 6,687,846 B1 | 2/2004 | Adrangi et al. |
| 6,694,335 B1 | 2/2004 | Hopmann et al. |
| 6,785,707 B2 | 8/2004 | Teeple |
| 6,789,114 B1* | 9/2004 | Garg et al. ............... 709/224 |
| 6,816,862 B2 | 11/2004 | Mulgund et al. |
| 6,832,373 B2 | 12/2004 | O'Neill |
| 6,847,974 B2 | 1/2005 | Wachtel |
| 6,859,831 B1 | 2/2005 | Gelvin et al. |
| 6,891,823 B1 | 5/2005 | Schwartz et al. |
| 6,927,686 B2 | 8/2005 | Nieters et al. |
| 6,961,763 B1 | 11/2005 | Wang et al. |
| 6,980,993 B2 | 12/2005 | Horvitz et al. |
| 6,990,660 B2 | 1/2006 | Moshir et al. |
| 7,024,430 B1 | 4/2006 | Ingraham et al. |
| 7,043,419 B2 | 5/2006 | Chess et al. |
| 7,072,960 B2 | 7/2006 | Graupner et al. |
| 7,075,960 B2 | 7/2006 | Kohara et al. |
| 7,099,582 B2 | 8/2006 | Belhadj-Yahya et al. |
| 7,099,946 B2 | 8/2006 | Lennon et al. |
| 7,114,146 B2 | 9/2006 | Zhang et al. |
| 7,116,674 B2 | 10/2006 | Shi |
| 7,130,773 B1* | 10/2006 | Wong ............... 702/189 |
| 7,171,471 B1 | 1/2007 | Nair |
| 7,206,289 B2 | 4/2007 | Hamada |
| 7,219,254 B2 | 5/2007 | Rathunde et al. |
| 7,227,889 B1 | 6/2007 | Roeck et al. |
| 7,237,243 B2 | 6/2007 | Sutton et al. |
| 7,292,963 B2 | 11/2007 | Bornhoevd et al. |
| 7,304,976 B2 | 12/2007 | Mao et al. |
| 7,312,703 B2 | 12/2007 | Hoogenboom |
| 7,313,467 B2 | 12/2007 | Breed et al. |
| 7,382,741 B2 | 6/2008 | Rao |
| 7,413,513 B2 | 8/2008 | Nguyen et al. |
| 7,467,018 B1* | 12/2008 | Callaghan ............... 700/1 |
| 7,554,920 B2 | 6/2009 | Alam et al. |
| 7,557,707 B2 | 7/2009 | Kumar et al. |
| 7,860,968 B2 | 12/2010 | Bornhoevd et al. |
| 2002/0004828 A1* | 1/2002 | Davis et al. ............... 709/223 |
| 2002/0007422 A1 | 1/2002 | Bennett |
| 2002/0073354 A1* | 6/2002 | Schroiff et al. ............... 714/4 |
| 2002/0100036 A1 | 7/2002 | Moshir et al. |
| 2002/0161751 A1 | 10/2002 | Mulgund et al. |
| 2002/0188866 A1 | 12/2002 | Ca et al. |
| 2002/0194181 A1 | 12/2002 | Wachtel |
| 2003/0005350 A1 | 1/2003 | Koning et al. |
| 2003/0016664 A1 | 1/2003 | MeLampy et al. |
| 2003/0078946 A1 | 4/2003 | Costello et al. |
| 2003/0097443 A1 | 5/2003 | Gillett et al. |
| 2003/0152041 A1* | 8/2003 | Herrmann et al. ............ 370/310 |
| 2003/0167406 A1* | 9/2003 | Beavers ............... 713/201 |
| 2003/0217186 A1 | 11/2003 | Bushey |
| 2003/0228910 A1 | 12/2003 | Jawaharlal et al. |
| 2004/0024768 A1 | 2/2004 | Haller |
| 2004/0059810 A1 | 3/2004 | Chess |
| 2004/0088231 A1 | 5/2004 | Davis |
| 2004/0121792 A1 | 6/2004 | Allen et al. |
| 2004/0181541 A1 | 9/2004 | Groenendaal et al. |
| 2004/0199804 A1 | 10/2004 | Rathunde et al. |
| 2004/0220910 A1 | 11/2004 | Zang et al. |
| 2004/0249944 A1 | 12/2004 | Hosking et al. |
| 2004/0250113 A1 | 12/2004 | Beck |
| 2005/0060365 A1 | 3/2005 | Robinson et al. |
| 2005/0071443 A1 | 3/2005 | Menon et al. |
| 2005/0114431 A1 | 5/2005 | Singh et al. |
| 2005/0198228 A1 | 9/2005 | Bajwa et al. |
| 2005/0228763 A1 | 10/2005 | Lewis et al. |
| 2005/0235058 A1 | 10/2005 | Rackus et al. |
| 2005/0235136 A1 | 10/2005 | Barsotti et al. |
| 2006/0022801 A1 | 2/2006 | Husak et al. |
| 2006/0026301 A1* | 2/2006 | Maeda et al. ............... 709/246 |
| 2006/0031447 A1* | 2/2006 | Holt et al. ............... 709/223 |
| 2006/0047545 A1 | 3/2006 | Kumar et al. |
| 2006/0052882 A1 | 3/2006 | Kubach et al. |
| 2006/0074912 A1 | 4/2006 | Borthakur et al. |
| 2006/0106581 A1 | 5/2006 | Bornhoevd et al. |
| 2006/0107284 A1 | 5/2006 | Crawford et al. |
| 2006/0129367 A1 | 6/2006 | Mishra et al. |
| 2006/0143181 A1 | 6/2006 | Liu et al. |
| 2006/0146991 A1 | 7/2006 | Thompson et al. |
| 2006/0161909 A1 | 7/2006 | Pandey et al. |
| 2006/0206582 A1 | 9/2006 | Finn |
| 2006/0212453 A1 | 9/2006 | Eshel et al. |
| 2006/0215601 A1 | 9/2006 | Vleugels et al. |
| 2006/0235976 A1 | 10/2006 | Chen et al. |
| 2006/0265661 A1 | 11/2006 | Ball |
| 2006/0277079 A1 | 12/2006 | Gilligan et al. |
| 2007/0032244 A1 | 2/2007 | Counts et al. |
| 2007/0112574 A1 | 5/2007 | Greene |
| 2007/0118496 A1 | 5/2007 | Bornhoevd et al. |
| 2007/0118549 A1 | 5/2007 | Bornhoevd et al. |
| 2007/0118560 A1 | 5/2007 | Bornhoevd et al. |
| 2007/0123256 A1 | 5/2007 | Whitesell et al. |
| 2007/0130208 A1 | 6/2007 | Bornhoevd et al. |
| 2007/0168690 A1 | 7/2007 | Ross |
| 2007/0192464 A1 | 8/2007 | Tullberg et al. |
| 2007/0210916 A1* | 9/2007 | Ogushi et al. ............... 340/531 |
| 2007/0233881 A1 | 10/2007 | Nochta et al. |
| 2007/0249286 A1 | 10/2007 | Ma et al. |
| 2007/0251998 A1 | 11/2007 | Belenki |
| 2007/0282746 A1 | 12/2007 | Anke et al. |
| 2007/0282988 A1 | 12/2007 | Bornhoevd et al. |
| 2007/0283001 A1 | 12/2007 | Spiess et al. |
| 2007/0283002 A1 | 12/2007 | Bornhoevd et al. |
| 2008/0010284 A1 | 1/2008 | Beck |
| 2008/0021976 A1* | 1/2008 | Chen et al. ............... 709/217 |
| 2008/0028068 A1* | 1/2008 | Nochta et al. ............... 709/224 |
| 2008/0033785 A1 | 2/2008 | Anke |
| 2008/0270486 A1 | 10/2008 | Hind et al. |
| 2008/0306798 A1 | 12/2008 | Anke et al. |

FOREIGN PATENT DOCUMENTS

| | | |
|---|---|---|
| EP | 0810755 A3 | 3/1999 |
| EP | 1372073 A2 | 12/2003 |
| EP | 1788480 A2 | 5/2007 |
| EP | 1863223 A1 | 12/2007 |
| EP | 1892656 A1 | 2/2008 |
| JP | 2002500785 | 1/2002 |
| JP | 2003067351 | 3/2003 |
| JP | 2004110318 A2 | 4/2004 |
| WO | 2005106666 A1 | 11/2005 |

OTHER PUBLICATIONS

Baker, M. et al., "Grids and Grid Technologies for wide-area Distributed Computing", Software—Practice & Experience (Sep. 27, 2002), pp. 1437-1466.

Mikic-Rakic, M et al., "Improving availability in large, distributed component-based systems via redeployment", LNCS, vol. 3798 (Nov. 3, 2005), 15 pgs.

Malek, S et al., "A decentralized redeployment algorithm for improving the availability of distributed systems", LNCS, vol. 3798 (Nov. 3, 2005), 13 pgs.

Hoareau, D et al., "Constraint-Based Deployment of Distributed Components in a Dynamic Network", LNCS, vol. 3894 (Mar. 16, 2006), pp. 450-464.

Bitkom, "RFID White Paper Technology, Systems and Applications", An Overview for companies seeking to use RFID technology to connect their IT systems directly to the "real" world, Dec. 2005, 50 pgs.

Mikic-Rakic, M et al., "A tailorable environment for assessing the quality of deployment architectures in highly distributed settings", Second International Working Conference on Component Deployment (2004), pp. 1-15.

Ploennigs, J et al., "A traffic model for networked devices in the building automation", In: Proceedings of the 5th IEEE International Workshop on Factory Communication Systems (WFCS 2004), Vienna, Austria, (2004), pp. 137-145.

Wu, Q et al., "Adaptive component allocation in scudware middleware for ubiquitous computing", LNCS, vol. 3824 (Dec. 6, 2005), pp. 1155-1164.

Wegdam, M et al., "Dynamic reconfiguration and load distribution in component middleware", PhD thesis, University of Twente, Enschede, (2003), pp. 1-257.

Colt, Charles et al., "Oracle Â® Collaboration Suite, Deployment Guide10g Release 1 (10.1.1) B14479-02", (Oct. 2005), pp. 1-230.

Malek, S et al., "A style-aware architectural middleware for resource-constrained,distributed systems", IEEE Transactions on Software Engineering, vol. 31, Issue 3 (Mar. 2005), pp. 256-272.

Lacour, S et al., "A Software Architecture for Automatic Deployment of CORBA Components Using Grid Technologies", Networking and Internet Architecture, DECOR04 (Nov. 24, 2004), pp. 187-192.

Kichkaylo, T et al., "Constrained Component Deployment in Wide-Area Networks Using AI Planning Techniques", Proceedings of the 17th International Symposium on Parallel and Distributed Processing 2003), pp. 1-10.

Akehurst, D H., et al., "Design Support for Distributed Systems: DSE4DS", Proceedings of the 7th Cabernet Radicals Workshop (Oct. 2002), pp. 1-6.

Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.

Wu, X et al., "Performance modeling from software components", ACM SIGSOFT Software Engineering Notes, vol. 29, Issue 1 (Jan. 2004), pp. 290-301.

Stewart, C et al., "Profile driven Component Placement for Cluster-based Online Services", IEEE Distributed Systems Online, vol. 5, No. 10, (Oct. 2004), p. 1-6.

Perkins, C. et al., "IP Mobility Support for IPv4", IETF Standard, Internet Engineering Task Force (Aug. 2002), pp. 1-100.

Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.

Carzaniga, Antonio et al., "Designing distributed applications with mobile code paradigms", In: Proceedings of the 19th International Conference on Software Engineering, Boston, Massachusetts, (1997), pp. 22-32.

Chandra, Bharat et al., "Resource management for scalable disconnected access to web services", WWW '01: Proceedings of the 10th International Conference on World Wide Web (May 5, 2001), pp. 245-256.

Fredriksson, Johan et al., "Calculating Resource Trade-offs when Mapping Component Services to Real-Time Tasks", Fourth Conference on Software Engineering Research and Practice (Oct. 2004), pp. 1-8.

Deering, S. et al., "ICMP Router Discovery Messages", IETF Standard, Internet Engineering Task Force (Sep. 1991), pp. 1-19.

Sgroi, Marco et al., "A Service-Based Universal Application Interface for Ad-hoc Wireless Sensor Networks", Preliminary Draft (Nov. 26, 2003), pp. 1-39.

Srivastava, U., et al., "Operator Placement for In-Network Stream Query Processing", Proceedings of the 24th ACM SIGMOD-SIGACT-SIGART Symposium on Principles of Database Systems (Dec. 2004), pp. 1-10.

Vigna, G., "Mobile Code Technologies, Paradigms, and Applications", PhD Thesis (1998), pp. 1-89.

Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.

Overeinder, B. et al., "A Dynamic load balancing system for parallel cluster computing", Future Generations computer Systems, Elsevier Science Publishers, Amsterdam, 12, (1), (May 1996), pp. 101-115.

Foster, I. et al., "Globus: A Metacomputing Infrastructure Toolkit", The International Journal of Supercomputer Application and High performance Computing, MIT Press, US, 11 (2), (Jun. 21, 1997), pp. 115-128.

Ferreira, L. et al., "Introduction to Grid Computing with globus", IBM International Technical Support Organization, 2nd edition (Sep. 2003), pp. 1-58.

Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.

Bornhoevd, C. et al., "Integrating Smart Items with Business Processes an Experience Report", IEEE Proceedings of the 38th Hawaii International Conference on System Sciences (Jan. 3, 2005), pp. 1-8.

Bornhoevd, Christof et al., "Integrating Automatic Data Acquisition with Business Processes Experiences with SAPs Auto-ID Infrastructure", Very Large Data Conference (Sep. 3, 2004), pp. 1-8.

Boudec, Jean-Yves L., et al., "A Theory of Deterministic Queuing Systems for the Internet", Network Calculus, Online Version of the Book Springer Verlag—LNCS 2050, (May 10, 2004), pp. 1-269.

Anke, J. et al., "A Planning Method for Component Placement in Smart Item Environments Using Heuristic Search", Proceedings of the 7th IFIP WG 6.1 International Conference, Distributed Applications and Interoperable Systems, Jun. 2007, pp. 309-322.

Wiemann, M. et al., "A Service and Device Monitoring Service for Smart Items Infrastructures", Third International Conference on Wireless and Mobile Communications 2007, ICWMC, 6 pages.

Anke, J. et al., "A Service-Oriented Middleware for Integration and Management of Heterogeneous Smart Items Environments", Proceedings of the 4th MiNEMA Workshop, Jul. 2006, pp. 7-11.

Anke, J. et al., "Cost-based Deployment Planning for Components in Smart Item Environments", IEEE Conference on Emerging Technologies and Factory Automation, Sep. 2006, pp. 1238-1245.

Hasiotis, T., et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.

Buchholz, S. et al., "Adaptation-Aware Web Caching: Caching in the Future Pervasive Web", In: KiVS, (2003), pp. 55-66.

Basile, C., et al, "A Survey of Dependability Issues in Mobile Wireless Networks", Technical Report, LAAS CNRS (Feb. 21, 2003), 45 pages.

Gao, T., et al "Toward QoS Analysis of Adaptive Service-Oriented Architecture", Service-Oriented System Engineering, IEEE International Workshop (Oct. 20, 2005), pp. 1-8.

Spiess, P., et al, "Collaborative Business Items", Deliverable 401: Final Project Report, CoBIs Project No. IST-004270, Version 2.0 (Mar. 2007), pp. 1-42.

Domagalski, R., et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24, 2004, 12 pages.

Bellavista, P., et al., "The Ubiquitous Provisioning of Internet Services to Portable Devices", Pervasive Computing, Jul. 2002, pp. 81-87.

"MVP Brochure", Bitfone Corporation (2005), www.bitfone.com/usa/uploads/mvp.brochure (Retrieved Sep. 20, 2005), pp. 1-3.

European Search Report for Application No. 07010671.1 mailed on Nov. 16, 2007, 4 pgs.

European Search Report for EP Application No. 07010654.7 mailed on Oct. 5, 2007, 4 pgs.

Karlof, C. et al., "Secure Routing in Wireless Sensor Networks: Attacks and Countermeasures", Proceedings of the First IEEE Sensor Network Protocols and Applications, May 2003, pp. 113-127.

Koo, C. Y., "Broadcast in Radio Networks Tolerating Byzantine Adversarial Behavior", Proceedings of the twenty-third annual ACM symposium on Principles of distributed computing, 2004, pp. 275-282.

Koushanfar, F. et al., "Fault Tolerance Techniques for Wireless Ad hoc Sensor Networks", Proceedings of IEEE Sensors, vol. 2, 2002, pp. 1491-1496.

Krishnamachari, B. et al., "Distributed Bayesian Algorithms for Fault-Tolerant Event Region Detection in Wireless Sensor Networks", IEEE Transactions on Computers, vol. 53, No. 03, Mar. 2004, pp. 241-250.

Lamport, L. et al., "The Byzantine Generals Problem", ACM Transactions on Programming Languages and Systems, vol. 04, No. 03, Jul. 1982, pp. 382-401.

Langendoen, K., et al., "Murphy loves potatoes: experiences from a pilot sensor network deployment in precision agriculture", IPDPS 20th International Parallel and Distributed Processing Symposium (Jun. 26, 2006), 8 pages.

Levis, P. et al., "A Tiny Virtual Machine for Sensor Networks", In ASPLOS-X: Proceedings of the 10th international conference on Architectural support for programming languages and operating systems, ACM Press, 2002, pp. 85-95.

Li, N. et al., "A Fault-Tolerant Topology Control Algorithm for Wireless Networks.", Proceedings of the 10th Annual International Conference on Mobile Computing and Networking, 2004, pp. 275-286.

Liang, Q. "Clusterhead Election for Mobile Ad hoc Wireless Network", Proceedings on Personal, Indoor and Mobile Radio Communications, vol. 2, 2003, pp. 1623-1628.

Liu, T. et al., "Impala: A Middleware System for Managing Autonomic, Parallel Sensor Systems.", Proceedings of the ninth ACM SIGPLAN symposium on Principles and practice of parallel programming, ACM Press, Jun. 11-13, 2003, pp. 107-118.

Ma, C. et al., "A Prioritized Battery-aware Routing Protocol for Wireless Ad hoc Networks.", Proceedings of the 8th ACM international symposium on Modeling, analysis and simulation of wireless and mobile systems, 2005, pp. 45-52.

Mainwaring, A., et al., "Wireless sensor networks for habitat monitoring.", In WSNSA'02: Proceedings of the 1st ACM international workshop on Wireless sensor networks and applications, New York, NY, USA, ACM Press, Sep. 28, 2002, pp. 88-97.

Marculescu, D. et al., "Fault-Tolerant Techniques for Ambient Intelligent Distributed Systems", Proceedings of the 2003 IEEE/ACM international conference on Computer-aided design, 2003, 8 pages.

Marti, S. et al., "Mitigating Routing Misbehavior in Mobile Ad hoc Networks", Proceedings of the 6th annual international conference on Mobile computing and networking, 2000, pp. 255-265.

Martinez, K, et al., "Glacial environment monitoring using sensor networks.", REALWSN (Jun. 21, 2005), 5 pages.

Marzullo, K. "Tolerating failures of continuous-valued sensors", ACM Transactions on Computer Systems, vol. 8, No. 4, 1990, pp. 1-28.

Rakhmatov, D. et al., "Battery Lifetime Prediction for Energy-aware Computing", Proceedings of the 2002 international symposium on Low power electronics and design, 2002, pp. 154-159.

Rakhmatov, D. et al., "Time-to-Failure Estimation for Batteries in Portable Electronic Systems", Proceedings of the 2001 international symposium on Low power electronics and design, 2001, pp. 88-91.

Ramanathan, N., et al., "Sympathy: a debugging system for sensor networks", In IEEE International Conference on Local Computer Networks, 2004, 2 pages.

Rong, P. et al., "Extending the lifetime of a network of battery-powered mobile devices by remote processing: A markovian decision-based approach.", Proceedings of the 40th conference on Design automation, New York, NY, USA, ACM Press, Jun. 2-6, 2003, pp. 906-911.

Rost, S., et al., "Memento: A health monitoring system for wireless sensor networks", SECON, vol. 2 (Sep. 28, 2006), pp. 1-10.

Rudenko, A. et al., "The Remote Processing Framework for Portable Computer Power Saving", In SAC'99: Proceedings of the 1999 ACM symposium on Applied computing, New York, NY, USA, ACM Press, 1999, pp. 365-372.

Ruiz, L. B., et al., "Fault Management in Event-driven Wireless Sensor Networks.", Proceedings of the 7th ACM international symposium on Modeling, analysis and simulation of wireless and mobile systems, Oct. 4-6, 2004, pp. 149-156.

Schmid, T. et al., "SensorScope: Experiences with a wireless building monitoring", REALWSN (Jun. 2005), 5 pages.

Staddon, J. et al., "Efficient Tracing of Failed nodes in Sensor Networks", Proceedings of the 1st ACM international workshop on Wireless sensor networks and applications, Sep. 28, 2002, pp. 122-130.

Szewczyk, R., et al., "An analysis of a large scale habitat monitoring application", In SenSys'04: Proceedings of the 2nd international conference on Embedded networked sensor systems (Nov. 3-5, 2004), pp. 214-226.

Szewczyk, R., et al., "Lessons from a sensor network expedition", In EWSN, 2004, pp. 307-322.

Tanenbaum, A. S., et al., "Introduction to Distributed Systems", Distributed Systems: Principles and Paradigms, Prentice Hall (Jan. 15, 2002), pp. 1-33.

Tateson, J., et al., "Real world issues in deploying a wireless sensor network for oceanography", in RealWSN' 05, 2004, 6 pages.

Tolle, G., et al., "A Macroscope in the redwoods", In SenSys'05: Proceedings of the 3rd international conference on Embedded networked sensor systems, Nov. 2-4, 2005, pp. 51-63.

Werner-Allen, G., et al., "Deploying a Wireless Sensor Network on an Active Volcano", IEEE Internet Computing (Mar.-Apr. 2006), 12 pgs.

Woo, A. et al., "Taming the Underlying Challenges of Reliable Multihop Routing in Sensor Networks", SenSys., ACM (Nov. 5-7, 2003), 14 pages.

Wood, A. D., et al., "Denial of Service in Sensor Networks", Cover Feature, IEEE Computer, vol. 35, Oct. 2002, pp. 48-56.

Akyildiz, I. F., et al, "A Survey on Sensor Networks", IEEE Communications Magazine (Aug. 2002), pp. 102-114.

Ringwald, M., et al, "SNIF: Sensor Network Inspection Framework", Technical Report 535, Department of Computer Science (Oct. 2006), 14 pages.

Non Final Office Action for U.S. Appl. No. 11/444,119, mailed on Aug. 28, 2009, 19 pages.

Non-Final Office Action for U.S. Appl. No. 11/444,119, mailed on Feb. 27, 2009, 23 Pages.

Non-Final Office Action for U.S. Appl. No. 11/283,618, mailed Oct. 28, 2008, 35 pages.

Final Office Action for U.S. Appl. No. 11/284,195, mailed Jun. 25, 2008, 31 pages.

Final Office Action for U.S. Appl. No. 11/283,618, mailed May 13, 2009, 32 pages.

U.S. Appl. No. 11/810,357, filed Jun. 5, 2007.

Golatowski, F et al., "Service-Oriented Software Architecture for Sensor Networks", International Workshop on Mobile Computing (Jun. 17-18, 2003), pp. 1-8.

Decasper, D. et al., "Router Plugins: A Software Architecture for Next Generation Routers", Computer Communication Review (Oct. 1998), pp. 229-240.

Wonohoesodo, R et al., "A Role Based Access Control for Web Services", Proceedings of the 2004 IEEE International Conference on Services Computing (2004), pp. 49-56.

Prabhu, B S., et al., "WinRFID—A Middleware for the Enablement of Radio Frequency Identification (RFID) Based Applications", Mobile, Wireless and Sensor Networks (Mar. 28, 2006), pp. 1-23.

Information Society Technologies, "State of the Art in Resource Management on Wired and Wireless Access Networks with Resilience", Jul. 23, 2004, pp. 1-198.

Carvalho, H et al., "A General Data Fusion Architecture", Proceedings of the 6th International Conference on Information Fusion (Jul. 2003), pp. 1-8.

Hawick, K A., et al., "Middleware for Wireless Sensors and Robots", DHPC Technical Report DHPC-112 (Aug. 18, 2002), pp. 1-6.

European Search Report for Application No. EP07005127.1, mailed Jul. 20, 2007, pp. 1-3.

European Search Report for Application No. EP07008409.0, mailed Aug. 24, 2007, pp. 1-4.

European Search Report for Application No. EP07009428.9, mailed Oct. 4, 2007, pp. 1-4.

European Search Report for Application No. EP07014724.4, mailed Nov. 27, 2007, pp. 1-4.

European Search Report for Application No. EP06023720.3, mailed Apr. 10, 2007, pp. 1-4.

European Search Report for Application No. EP06023256.8, mailed May 9, 2007, pp. 1-5.

Extended European Search Report for Application No. 08017795.9, mailed Feb. 10, 2009, 11 pgs.

"Composite Capability/Preference Profiles (CC/PP): Structure and Vocabularies 1.0", W3C Recommendation (Jan. 15, 2004), pp. 1-78.

Spiess, P., et al., "Going Beyond Auto-ID: A Service-oriented Smart Items Infrastructure", Journal of Enterprise Information Management, vol. 20, Issue 3 (2007), pp. 1-9.

Yao, Y., et al., "Query Processing for Sensor Networks", Proceedings of the 2003 CIDR Conference, Jan. 2003, 12 pages.

Skouteli, C., et al., "Concept-Based Discovery of Mobile Services", Proceedings of the 6th International Conference on Mobile Data Management, Ayia Napa Cyprus, May 13, 2005, 5 pages.

Gounaris, A., et al., "Adaptive Query Processing: A Survey", Lecture Notes in Computer Science, vol. 2405, Archive of Proceedings of the 19th British National Conference on Databases: Advances in Databases, 2002, pp. 11-25.

Hill, J. L., "System Architecture for Wireless Sensor Networks", Dissertation of Jason L. Hill, University of California, Berkeley (2003), 196 pages.

"FAQ: Fault management—How does Fault Management Work?" GoAhead Software (2000), 9 pgs.

Spiess, P., et al, "Collaborative Business Items", Deliverable 401: Management & Maintenance Requirements, CoBIs Project No. IST-004270, Version 1.0 (Jan. 2005), 21 pgs.

"FIPA Device Ontology Specification", Foundation for Intelligent Physical Agents (Apr. 9, 2001), pp. 1-15.

Levis, P., et al., "TinyOS: An Operating System for Sensor Networks", Feb. 17, 2004, pp. 1-32.

Chatterjee, M., et al., "WCA: A Weighted Clustering Alogrithm for Mobile Ad Hoc Networks", Cluster Computing 5, Klluwer Academic Publishers, 2002, pp. 193-204.

Greenstein, B., et al., "A Sensor Network Application Construction Kit (SNACK)", SenSys '04, Nov. 3-5, 2004, 12 pages.

"The OSGi Service Platform—Dynamic services for networked devices", Retrieved on Nov. 16, 2005 from <www.osgi.org/osgi_technology/index.asp?section=2>, 5 pgs.

"TINYOS: Mission Statement", Retrieved on Nov. 16, 2005 from <www.tinyos.net/special/mission>, 2 pgs.

Bandara, A., et al., "An Ontological Framework for Semantic Description of Devices", Nov. 11, 2004, 2 pgs.

Vasudevan, S., et al., "Design and Analysis of a Leader Election Algorithm for Mobile Ad Hoc Networks", Proceedings of 12th IEEE ICNP, Oct. 8, 2004, 11 pages.

Liu, J., et al., "QoS-aware Service Location in Mobile Ad-Hoc Networks", Proceedings of the 5th International Conference on Mobile Data Management, Berkeley, CA USA, Jan. 2004, 12 pages.

Liu, J., et al., "Group Management for Mobile Ad Hoc Networks: Design, Implementation and Experiment", Proceedings of the 6th International Conference on Mobile Data Management, Ayia Napa Cyprus, May 13, 2005, 8 pages.

European Search Report for EP Application No. 07010652.1 mailed on Oct. 26, 2007, 3 pgs.

"Collaborative Business Items", CoBIs Deliverable D104 Final Project Report, IST-004270, Version 2.0 (Mar. 2007), pp. 1-42.

"Service-Oriented Cross-layer infrastructure for Distributed smart Embedded devices", SOCRADES (Sep. 1, 2006), pp. 1-7.

Benini, L., "A Discrete-Time Battery Model for High-Level Power Estimation", In Proceeding of the Design, Automation and Test in Europe Conference and Exhibition 2000, pp. 35-39.

Birolini, A., "Quality and Reliability of Technical Systems", IEEE Transactions on Reliability, 2nd edition, vol. 48, Issue 2 (Jun. 1999), pp. 205-206.

Bredin, J. L., "Deploying Sensor Networks with Guaranteed Capacity and Fault Tolerance", In Proceedings of the 6th ACM international symposium on Mobile ad hoc networking and computing, May 27, 2005, 11 pgs.

Desovski, D., "Linear Randomized Voting Algorithm for Fault Tolerant Sensor Fusion and the Corresponding Reliability Model", IEEE International Symposium on Systems Engineering, Oct. 2005, pp. 153-162.

Ding, M. et al., "Localized Fault-Tolerant Event Boundary Detection in Sensor Networks", Aug. 22, 2005, 12 pgs.

Estrin, D. et al., "Next Century Challenges: Scalable Coordination in Sensor Networks", MobiCom '99, 1999, pp. 263-270.

Fok, C.L. et al., "Mobile Agent Middleware for Sensor Networks: An Application Case Study", Proceedings of the 4th International Symposium on Information Processing in Sensor Networks (Apr. 27, 2005), 6 pgs.

Frank, C., et al., "Algorithms for Generic Role Assignment in Wireless Sensor Networks", Proceedings of the 3rd international conference on bedded networked sensor systems, Nov. 2005, 13 pgs.

Ganesan, D., et al., "Highly-Resilient, Energy-Efficient Multipath Routing in Wireless Sensor Networks.", Mobile Computing and Communications Review, vol. 1, No. 2, 1997, 13 pages.

Graham, S., et al, "Web Services Base Notification 1.3", OASIS Standard (Oct. 1, 2006), pp. 1-68.

Guerraoui, R. et al., "Fault-Tolerance by Replication in Distributed Systems", Proceedings of the 1996 Ada-Europe International Conference on Reliable Software Technologies, 1996, pp. 38-57.

Gupta, I. et al., "Cluster-Head Election Using Fuzzy Logic for Wireless Sensor Networks.", Proceedings of the 3rd Annual Communication Networks and Services Research Conference (May 31, 2005), pp. 1-71.

Gupta, G. et al., "Fault-Tolerant Clustering of Wireless Sensor Networks", IEEE, Wireless Communications and Networking, vol. 3, Mar. 20, 2003, pp. 1579-1584.

Harte, S. et al., "Fault Tolerance in Sensor Networks Using Self-Diagnosing Sensor Nodes.", IEEE International Workshop on Intelligent Environment, Jun. 2005, pp. 7-12.

Heinzelman, W. R., et al., "Energy-Efficient Communication Protocol for Wireless Microsensor", Proceedings of the 33rd Hawaii International Conference on System Sciences, vol. 8, 2000, pp. 1-10.

US 7,752,304, 07/2010, Bornhoevd et al. (withdrawn).

Hwang, S-Y, et al "Personal Workflows: Modeling and Management", MDM 2003, LNCS 2574, pp. 141-152.

Office Action for Japanese Application No. 2006-314565 (with English Translation), mailed Feb. 12, 2010, 9 pages.

Sheng, Q. Z., et al "Enabling Personalized Composition and Adaptive Provisioning of Web Services", CAiSE 2004, LNCS 2084, pp. 322-337.

Office Action for European Application No. 08017795.9, mailed Feb. 26, 2010, 7 pages.

Benatallah, B., "Facilitating the Rapid Development and Scalable Orchestration of Composite Web Services", 2005 Springer Science + Business Media, Inc., pp. 1-33.

Casati, F., et al "Specification and Implementation of Exceptions in Workflow Management Systems", ACM Transactions on Database Systems, vol. 24, No. 3, Sep. 1993, pp. 405-451.

ETSI, "Selection procedures for the choice of radio transmission technologies of the UMTS", Universal Mobile Telecommunications System 30.03 version 3.2.0 (Apr. 1998), pp. 1-84.

Office Action for Chinese Application No. 200610149268.7 (with English Translation), mailed Mar. 1, 2010, 16 pages.

Second Office Action for Chinese Application No. 200610149270.4, mailed Mar. 1, 2010, 18 pages.

Decker, C., et al, "Coupling Enterprise Systems with Wireless Sensor Nodes: Analysis, Implementation, Experiences and Guidelines", Feb. 26, 2010, 8 pages.

Graupner, S., et al, "A Framework for Analyzing and Organizing Complex Systems", Hewlett Packard, Computer Systems and Technology Laboratory, Feb. 6, 2001, 17 pages.

Krause, A., et al, "Near-Optimal Sensor Placements: Maximizing Information While Minimizing Communication Cost", Proceedings of the 5th International Conference on Information Processing in Sensor Networks, Apr. 19-21, 2006, 9 pages.

Tolksdorf, R., "Coordination Technology for Workflows on the Web: Workspace", Coordination 2000, LNCS 1906, Springer-Verlag Berlin Heidelberg 2000, pp. 36-50.

Non-Final Office Action for U.S. Appl. No. 11/871,616, mailed Mar. 9, 2010, 46 pages.

Non-Final Office Action for U.S. Appl. No. 11/810,357, mailed Apr. 26, 2010, 44 pages.

Non-Final Office Action for U.S. Appl. No. 11/479,284, mailed May 14, 2008, 16 pages.

Final Office Action for U.S. Appl. No. 11/479,284, mailed Feb. 23, 2009, 15 pages.

Notice of Allowance for U.S. Appl. No. 11/479,284, mailed May 13, 2010, 30 pages.

Non-Final Office Action for U.S. Appl. No. 11/413,230, mailed Apr. 27, 2010, 24 pages.

Non Final Office Action for U.S. Appl. No. 11/444,119, mailed on Mar. 30, 2010, 45 pages.

Non-Final Office Action for U.S. Appl. No. 11/283,618, mailed on May 24, 2010, 42 pages.

Non-Final Office Action for U.S. Appl. No. 11/284,195, mailed Nov. 1, 2007, 14 pages.
Advisory Action for U.S. Appl. No. 11/284,195, mailed Oct. 9, 2008, 4 pages.
Restriction Requirement for U.S. Appl. No. 11/444,279, mailed May 5, 2009, 5 pages.
Non-Final Office Action for U.S. Appl. No. 11/396,299, mailed Jul. 9, 2009, 15 pages.
Non-Final Office Action for U.S. Appl. No. 11/443,549, mailed Aug. 13, 2009, 18 pages.
US 7,801,983, 09/2010, Bornhoevd et al. (withdrawn).
Ardaiz, et al, "On Service Deployment in Ubiquitous Computing", Proceedings of the 2nd International Workshop on Ubiquitous Computing and Communications, Sep. 2001, 7 pages.
Arkin, et al, "Web Services Business Process Execution Language Version 2.0", Committee Draft, Sep. 2005, 81 pages.
Arkin, et al, "Web Service Choreography Interface (WSCI) Version 1.0", W3C Note, Aug. 2002, 84 pages.
Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.
Box, et al, "Web Services Eventing (WS-Eventing)", Aug. 2004, 16 pages.
Crossbow, "Wireless Sensor Networks: Sensor and Data-Acquisition Boards", 2004 Crossbow Technology, Inc retrieved on Sep. 13, 2010 from http://web.archive.org/web/20040111135950/http://www.xbow.com/Products/productsdetails.aspx?sid=63, 1 page.
Crossbow, "Stargate: X-Scale Processor Platform SPB 400", retrieved on Dec. 20, 2005 from http://www.xbow.com/Products/productsdetails.aspx?sid=63, 2 pages.
Clement, et al, "UDDI version 3.2, UDDI Spec Technical Committee Draft, OASIS, UDDI Spec I C", Oct. 2004, 420 pages.
Christensen, et al, "Web Services Description Language (WSDL) 1.1", W3C Note, Mar. 2001, 27 pages.
Koh, et al, "Securing the Pharmaceutical Supply", White Paper, 2003, 19 pages.
California Software Laboratories, "White Paper: The JetSend Appliance Architecture", retrieved from http://www.calsoftlabs.com/whitepapers/jetsend-architecture.html, 2002, 28 pages.
Davenport, "Process Innovation: Reengineering work through information technology", Harvard Business School Press, 1993, 6 pages.
de Sales, et al, "Towards the UPnP-UP: Enabling User Profile to Support Customized Services in UPnP Networks", Proceedings of the 2008 The Second International Conference on Mobile Ubiquitous Computing, Systems, Services and Technologies, 2008, pp. 206-211.
Decker, et al, "CoBIs Platform Survey and State-of-the-Art Sensor Platforms", CoBIs Deliverable Report, Aug. 2005, 51 pages.
Deering, et al, "Internet Protocol, Version 6 (Ipv6) Specification", Network Working Group, Dec. 1998, 39 pages.
Gauger, "FlexCup—Flexible and Efficient Code Updates for Sensor Networks", Summer School on Wireless Sensor Networks and Smart Objects; Universität Stuttgart, Aug. 29-Sep. 3, 2005, 8 pages.
Geller, et al. "Web Services Eventing (WS-Eventing)", Aug. 2004, 38 pages.
Gudgin, et al, "SOAP Message Transmission Optimization Mechanism", Jan. 25, 2005, 15 pages.
Guttman, "Service Location Protocol", Version 2, Jun. 1999, 55 pages.
Haas, "Service Deployment in Programmable Networks", PhD Thesis, ETH Zurich, Switzerland, 2003, 253 pages.
Hammer, et al, "Reengineering the Corporation—A Manifesto for Business Revolution", Nicholas Brealey Publishing, May 1994, 14 pages.
Han, et al, "Sensor Network Software Update Management: A Survey", Journal of Network Management, 2005, 26 pages.
Intel Research, "An Introduction to Wireless Sensor Networks", Technical Report, 2004, 6 pages.
Karuppiah, et al, "Design and Implementation of Multihomed IPv6 Testbed Network for Research Community: The Malaysian IPv6 Network Operation Centre Experience", IWS2000, APAN Conference, Tsukuba 2000 6 pages.

Kim, et al, "A leader election algorithm in a distributed computing system", 5th IEEE Workshop on Future Trends of Distributed Computing Systems, 1995, 5 pages.
Kiselyov, "Functional XML parsing framework: SAX/DOM and SXML parsers with support for XML Namespaces and validation", 2001, 42 pages.
Lampe, et al, "A ubiquitous computing environment for aircraft maintenance", SAC '04: Proceedings of the 2004 ACM Symposium on Applied Computing, 2004, pp. 1586-1592.
Law, et al, "Assessing Security-Critical Energy-Efficient Sensor Networks", 2002, 10 pages.
Malpani, et al, "Leader election algorithms for mobile ad hoc networks", Proceedings of the 4th international Workshop on Discrete Algorithms and Methods for Mobile Computing and Communications, Aug. 11, 2000, pp. 96-103.
Nochta, et al, "Relocatable services and service classification scheme", Authorization Level: Public (PU) Version 1.0, Feb. 2005, 59 pages.
Nokia, "Nokia Intellisync Device Management", Overview for IT Managers, May 2007, 19 pages.
"OSGI Service Platform", Release 3, IOS Press, Mar. 2003, 602 pages.
Parikh, et al, "Security in Sensor Networks", CS 588: Cryptography, 2001, 28 pages.
Park, "Specification of the Bluetooth System: Wireless connections made easy", Covered Core Package version: 1.2, Nov. 2003, 1200 pages.
Passing, "Profiling, Monitoring and Tracing in SAP WebAS", SAP Library, Jun. 22, 2005, 9 pages.
Phillips, "Aqueduct: Robust and Efficient Code Propagation in Heterogeneous Wireless Sensor Networks", Master's Thesis submitted to the Graduate School of the University of Colorado, 2005, 61 pages.
Postel, "Internet Control Message Protocol", Protocol Specification. Request for Comments RFC 792, Sep. 1981, 21 pages.
Postel, "Internet Protocol", Protocol Specification, Request for Comments RFC 791, Sep. 1981, 51 pages.
Postel, "Transmission Control Protocol", Protocol Specification, Request for Comments RFC 793, Sep. 1981, 91 pages.
Postel, "User Datagram Protocol", Protocol Specification, Request for Comment, RFC 768, Information Sciences Institute, Aug. 1980, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Adaptive Technology for the Networked Enterprise", Feb. 2005, retrieves on Sep. 9, 2010 from http://web.archive.org/web/*/http://www.sap.com/solutions/netweaver/index.epx, 1 page.
SAP, "Security Guide for Mobile Engine 2.1 SP02", SAP Library—SAP Mobile Engine, Dec. 1, 2004, 13 pages.
SAX, "About SAX", Dec. 29, 2004, retrieved on Sep. 9, 2010 from http://web.archive.org/web/20041229165357/http://www.saxproject.org/, 1 page.
Scheer, "Ads-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld ces Pervasive Computing, 2004, 29 pages.
Schneier, "Applied Cryptography", 2nd edition, John Wiley & Sons, Inc., 1996, 18 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.

Speiss, et al, "going beyond auto-id—a service-oriented smart items infrastructure", JEIM, Mar. 2007, 9 pages.

Strohbach, et al, "Cooperative Artefacts:Assessing Real World Situations with Embedded Technology", In Proceedings of the 6th International Conference on Ubiquitous Computing, Nottingham, UK, 2004, pp. 250-267.

Sun Microsystems, "Connected Limited Device Configuration", Java™ 2 Platform, Micro Edition (J2ME™) Specification Version 1.1, Mar. 2003, 60 pages.

Sun Microsystems, "Jini Architecture Specification", Version 1.2, Dec. 2001, 26 pages.

Sun Microsystems, "Sun SPOT System: Turning Vision into Reality", Sun SPOT System Project description, 2005, 4 pages.

Talwar, et al, "Approaches for Service Deployment", IEEE Internet Computing, vol. 9(2), Mar.-Apr. 2005. pp. 70-80.

"Universal Plug and Play (UPnP)", Wikepedia, the free encyclopedia, Retrieved on Dec. 20, 2005, from http://enwikipedia.org/wiki/Universal_Plug_and_Play, 6 pages.

"UPnP Device Architecture 1.0", UPnP Forum, 1999, 80 pages.

van de Loo, et al, "Enterprise Services Design Guide", Version 1.0, SAP, 2005, pp. 1-40.

van der Aalst, "Modelling and analysing workflow using a Petri-net based approach", Proceedings of the 2nd Workshop on Computer-Supported Cooperative Work, Petri nets and related formalisms, 1994, pp. 31-50.

Veizades, et al, "Service Location Protocol. Request for Comments RFC 2165", Network Working Group, Jun. 1997, 72 pages.

VeriSign, "The EPCglobal Network: Enhancing the Supply Chain", VeriSign Technical Report, 2004, 8 pages.

Villanueva, et al, "Context-Aware QoS Provision for Mobile Ad-hoc Network-based Ambient Intelligent Environments", Header Background Image, 12(3), 2006, 13 pages.

Waldo, "The Jini architecture for network-centric computing", Communications of the ACM archive, vol. 42 Issue 7, Jul. 1999, pp. 76-82.

Wander, et al, "Energy Analysis of Public-Key Cryptography for Wireless Sensor Networks", UC Santa Cruz, Sun Microsystems Laboratories, 2005, 5 pages.

Wang, et al, "Timing Analysis of Real-Time Networked RFID Systems", Cambridge Auto-ID Lab, Cambridge UK, 2004, 4 pages.

Warneke, et al, "Smart dust: Communicating with a cubic-millimeter computer". Computer, 34(1), 2001. pp. 44-51.

Weiser, "The computer for the 21st century", ACM SIGMOBILE Mobile Computing and Communications Review archive, vol. 3, Issue 3, Jul. 1999, 6 pages.

"Java Native Interface (JNI)", Wikepedia, the free encyclopedia, Retrieved on Dec. 20, 2005, from http://enwikipedia.org/wiki/Jini, 6 pages.

"Service Location Protocol (SLP)", Wikepedia, the free encyclopedia, Retrieved on Dec. 20, 2005, from http://enwikipedia.org/wiki/Service_Location_Protocol, 1 page.

Woods, "Enterprise Services Architecture", Galileo Press, 2003, 10 pages.

Final Office Action for U.S. Appl. No. 11/479,284, mailed Jun. 11, 2009, 4 pages.

Notice of Allowance for U.S. Appl. No. 11/479,284, mailed on Oct. 13, 2010, 19 pages.

Non-Final Office Action for U.S. Appl. No. 11/479,284, mailed Oct. 30, 2009, 19 pages.

Notice of Allowance for U.S. Appl. No. 11/479,284, mailed Aug. 11, 2010, 19 pages.

Non-Final Office Action for U.S. Appl. No. 11/496,641, mailed Jul. 29, 2010, 35 pages.

Non-Final Office Action for U.S. Appl. No. 11/583,274, mailed Aug. 5, 2010, 21 pages.

Final Office Action for U.S. Appl. No. 11/444,119, mailed Aug. 24, 2010, 23 pages.

* cited by examiner

FAULT TOLERANCE FRAMEWORK FOR NETWORKS OF NODES

TECHNICAL FIELD

This description relates to fault tolerance in networks of nodes.

BACKGROUND

Software systems exist that provide various services for enterprises or other organizations. Such software systems may rely on decentralized, manual, and potentially error-prone data collection, while storing collected data in a centralized back-end system where business logic execution also occurs. These and other software systems may be extended through the use of smart item (also referred to as smart device), technologies, in which physical items (e.g., goods, tools, rooms, vehicles, persons, or shelves) are augmented or enhanced by the addition or inclusion of locally-provided or embedded technology.

For example, radio-frequency identification (RFID) systems, embedded systems, sensor motes, and/or sensor networks may be used in the above-described manner to provide business software applications with fast access to real-world data. For example, smart item technologies may be used support the detection, reading, or writing of RFID tags, as well as to support communication with, and control of, wireless sensor networks and embedded systems. In many instances, smart items may include, or may be associated with, devices having local processing power, memory, and/or communication capabilities, and that are capable of providing data about the device and its properties, or information about a current state or environment of the smart item devices. Accordingly, some such devices may be used in the execution of service components of back-end or underlying business applications, and, in particular, may do so in a collaborative way, e.g., by forming mobile ad-hoc networks to collect, process, or transmit business data.

Examples of smart items may include an RFID tag, which may be passive or active, and which may be attached to a physical object, as referenced above, and used to provide product or handling information related to the object. Other examples of smart items may include various sensors, such as, for example, environmental sensors (e.g., a temperature, humidity, or vibration sensor), which, as just referenced, may be capable of communicating to form one or more sensor networks. These and other types of smart items also may include embedded systems, which may refer generally to any system in which a special-purpose processor and/or program is included, and/or in which the system is encapsulated in the device being controlled.

Through automatic real-time object tracking and local, on-site execution of application logic (e.g., business logic), smart item technology may provide accurate and timely data, and may help streamline and automate related operations. Accordingly, cost reductions and additional business benefits (e.g., increased asset visibility, improved responsiveness, and extended business opportunities) may be obtained.

In practice, smart item and related technologies may be susceptible to a number of different types of flaws or faults, which may impair, alter, or prevent a desired behavior(s). Such faults may be related, for example, to a malfunction in an operation of the individual nodes themselves, such as when a node experiences a hardware or software failure. Faults also may relate to external forces, such as a fire or flood, which may affect the nodes. Faults also may occur at a network layer, e.g., during routing of messages between nodes. As a final example, faults may occur that are related to back-end applications attempting to benefit from the network(s) of nodes, such as when a back-end application(s) requests data from the network(s) of nodes in an incorrect manner.

Such faults may be problematic for a number of reasons. For example, failure to obtain necessary data from a node may cause a malfunction of another node, or of the back-end application(s). Even if the fault does not prevent local operations of a given node, then problems may arise if incorrect data is reported to the back-end application(s). Further, it may be difficult to determine where a potential fault may have occurred within the networks of nodes and associated data collection/processing devices. Consequently, failure to detect, determine, and correct such faults may result in otherwise-unnecessary costs, liabilities, or other difficulties.

Further with regard to such faults, and as referenced above, it may be appreciated that nodes may communicate with one another to form local networks, e.g., sensor networks. In a given sensor network, such communication may occur using a proprietary communications protocol that is understood by each of the network nodes, but that may not be understood by other nodes and/or networks. For example, the communications protocol of a sensor network may be unique to a particular hardware and/or software platform used in the sensor network, or may be unique to a manufacturer of the nodes. Accordingly, it may be difficult to collect (and respond to) fault-related data regarding such sensor networks in a timely fashion, in a format that is applicable to multiple ones of the sensor networks, and without overwhelming or depleting communications resources of the devices and/or sensor networks.

SUMMARY

In one general aspect, a first message handler may be configured to receive first network-related data associated with a first network of nodes, the first network of nodes using a first communications protocol. A second message handler may be configured to receive second network-related data associated with a second network of nodes, the second network of nodes using a second communications protocol. A message transport system may be configured to receive the first network-related data and the second network-related data and further configured to route the first network-related data and the second network-related data in a common protocol, and a fault manager may be configured to receive the network-related data in the common protocol and configured to determine a fault associated with an operation of one or more of the first network of nodes and the second network of nodes, based on the network-related data in the common protocol.

According to another general aspect, a system may include a middleware layer configured to communicate with a plurality of networks of nodes and configured to communicate with at least one back-end application. The middleware layer may include a platform abstraction layer configured to receive, from the plurality of networks of nodes, first network-related data and second network-related data in a first communications protocol and a second communications protocol, respectively, and configured to provide the first network-related data and the second network-related data in a common protocol, and a fault management layer configured to receive the first network-related data and the second network-related data in the common protocol, and configured to determine a fault associated with an operation of the plurality of networks, based thereon.

According to another general aspect, a method includes receiving network-related data associated with a plurality of networks of nodes at one of a plurality of message handlers, the plurality of message handlers each associated with a corresponding network of nodes and a corresponding communications protocol that is used by the corresponding network of nodes, translating the network-related data from the corresponding communications protocol into a common communications protocol, providing the network-related data in the common communications protocol to a state model describing state information related to the plurality of networks of nodes, diagnosing a fault associated with an operation of the plurality of networks of nodes, based on the state model; and recovering the fault by deploying a service to a node of the networks of nodes using the corresponding communications protocol used by the node.

The details of one or more implementations are set forth in the accompanying drawings and the description below. Other features will be apparent from the description and drawings, and from the claims.

DETAILED DESCRIPTION

Figure 1:
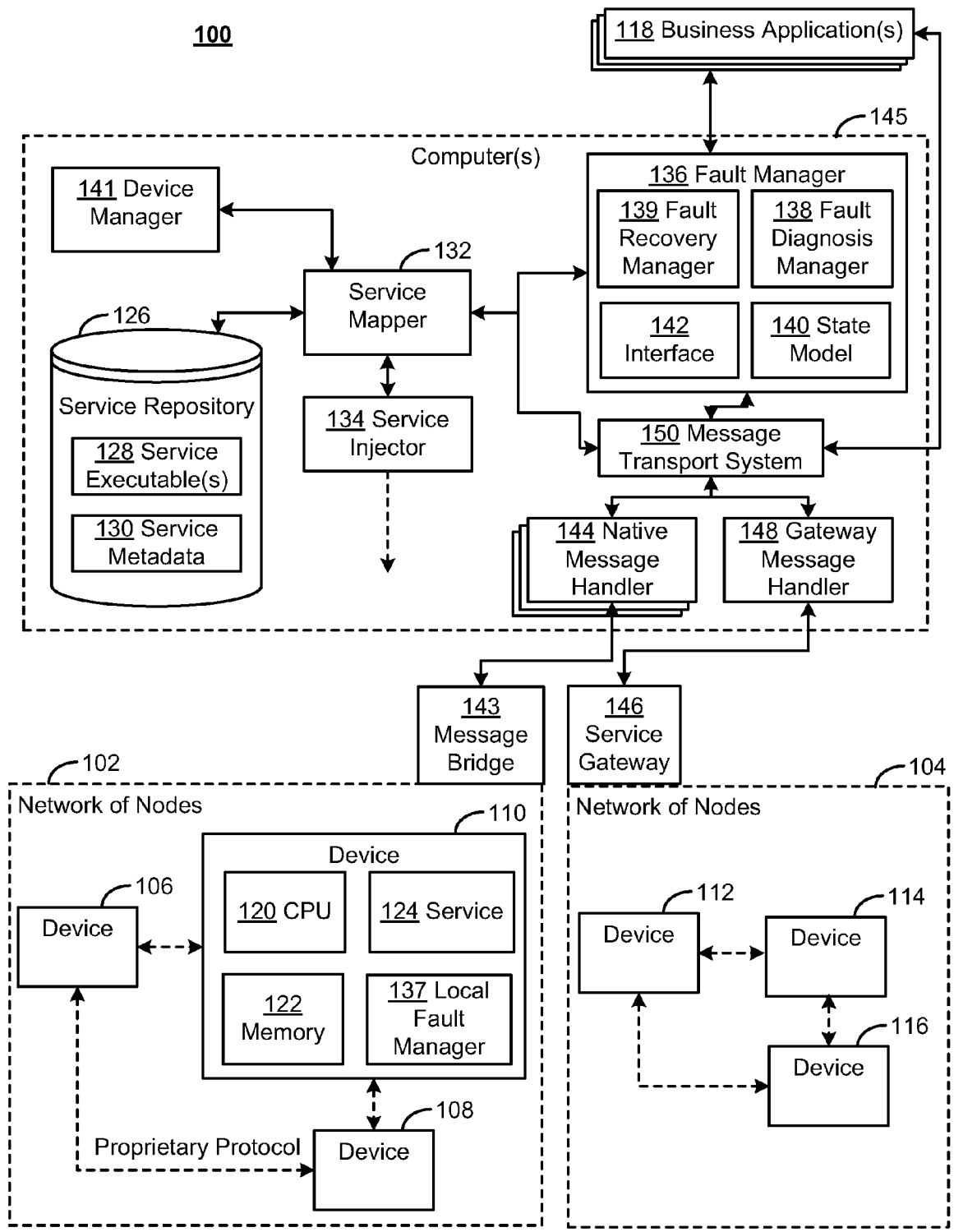
FIG. 1 is a block diagram of a system for fault tolerance in networks of nodes.

FIG. 1 is a block diagram of a system 100 for fault tolerance in networks of nodes. In the example of FIG. 1, faults in such networks of nodes may be detected, diagnosed, isolated, and corrected, without requiring additional data beyond that which is already being transmitted within the networks, without requiring in-network detection/diagnosis of fault(s), and without requiring an undue amount of redundancy/replication of nodes to account for or mitigate faults. Moreover, such faults may be determined and possibly corrected independently of whether the fault occurs at a device, middleware, network, or back-end application(s) that may be associated with the networks of nodes. In some example implementations, the system 100 may correct at least for software-related faults using a mapping function of the system 100, by which services (e.g., executable code) are deployed within the network(s) of nodes in such a way as to compensate or correct for the determined fault(s).

Further, the faults may be determined and possibly corrected even when the networks of nodes are each using different communications protocols. For example, as described below, the system 100 may be used to provide fault tolerance for different, distinct instances of a network platform, as well as instances of otherwise incompatible network platforms. That is, for example, the system 100 may be configured to perform fault tolerance for a plurality of different networks, even when the nodes of the networks use separate, different, and/or proprietary communications protocols to communicate with one another within their respective networks.

In the example of FIG. 1, a network may include or refer to sensor networks 102 and/or 104, where the sensor networks 102 and 104 may implement different communications protocols. In the example of FIG. 1, the sensor network 102 includes various smart items or smart devices 106, 108, and 110, while the sensor network 104 includes smart item devices 112, 114, and 116. In this context, it should be understood that the terms "smart items," "smart devices," "smart item devices," and similar terms, may be used similarly or interchangeably in various contexts. For example, the term "smart item" or "smart device" may refer to a device having local processing, storage, and communications capability, as referenced herein, or may refer to a combination of such a device and an object to which the device is affixed (e.g., a pallet containing merchandise for sale).

As part of the sensor networks 102 and 104 (and other/similar networks, not shown in FIG. 1), such devices and/or device/object combinations also may be referred to as "nodes," or "network nodes" in some contexts. In the present description, the term "device" may be used to refer to the described devices having the described features within the sensor networks 102 and 104. However, it should be understood that the concepts described herein related to fault tolerance for networks of nodes may relate to virtually any such setting. The concepts and techniques may be particularly useful, for example, in contexts similar to those described herein, in which the networks may include wireless networks in which the nodes are constrained with regard to available energy, memory, computational power, and bandwidth.

Thus, the devices 106-116, and potentially other devices within the sensor networks 102 and 104 (and other sensor networks) may provide real-world data to one or more business data processing systems, applications, or processes, in a timely and accurate manner. For example, as shown near the top of FIG. 1, the system 100 includes, or communicates with, a business application(s) 118. Examples of the business application(s) 118 may include, for example, inventory management systems, supply chain management systems, retail store management systems, warehouse management systems, product life cycle management systems, and any other system(s) that may be used to execute business processes with respect to real-world objects, where such real-world objects may include, for example, products for sale, pallets or other shipment elements, patients, or manufacturing materials/equipment. Thus, the business processes, including those portions of the business processes deployed and executed at the local level of the real-world objects, may be used, for example, to determine inventory levels, set pricing levels, evaluate marketing strategies, evaluate manufacturing or production technologies, reduce theft, or maintain safety.

In FIG. 1, the device 110 is illustrated as including a central processing unit (CPU) 120, as well as a memory 122. Thus, the device 104 should be understood to be capable of various levels of computing capabilities, including, for example, processing or transmitting sensed data (in the case where the device 110 includes, or is associated with, a sensor). Although not specifically illustrated in FIG. 1 for the sake of clarity and brevity, it should be understood that all of the devices 106-116 also may include the same, additional, or alternative computing capabilities, including, for example, the communication capability to form and participate in the sensor networks 102 and 104, as shown, which may include, for example, a wireless network(s) and/or a peer-to-peer network(s). That is, it should be understood that the devices 106-116 may include other standard elements and features, not specifically illustrated in FIG. 1 for the sake of brevity, such as, for example, a (e.g., radio) transceiver and a local power supply/battery.

Thus, the sensor networks 102 and 104 may be used to collect, process, filter, aggregate, or transmit data that may be useful to related business processes, and, more specifically, may be used to execute portions of the business processes (e.g., business logic), that are best-suited for (or benefit most highly from) local execution. Specifically, in the example of FIG. 1, portions of a business processes/business logic deployed on the sensor networks 102 and 104 may include a service 124 that is deployed on the device 110.

In general, it should be understood that the service 124, and other services discussed herein, refer generally to software components that support a defined functionality, may provide a defined interface through which the service may be invoked, and that may be combined with one another to obtain/provide additional or more complex functionalities. For example, the service 124 may represent an enabling service that, e.g., enables collaboration between two or more of the devices 106, 108, and 110; or may represent a management service that, e.g., manages power consumption of the device 110; or may represent actual business services that, e.g., execute business-specific logic (such as determining a local temperature, and whether the local temperature exceeds a defined value, and whether any action should be taken in response to the local temperature exceeding the defined value).

More specifically, the service 124 may represent instances of services (or service templates) stored in a service repository 126. The service repository 126 may thus provide a convenient location for registering, storing, and accessing services that may be deployed for use within the sensor network 102 (and/or the sensor network 104).

The service repository 126 stores service executables 128 and service metadata 130, where the service executables 128 represent, for example, software code that may be instantiated onto the devices 106, 108, and 110 (and/or the devices 112-116) for actual execution of associated business logic, while the service metadata 130 may represent or include, for example, various service descriptions and/or requirements that relate to whether and how the service(s) may be executed on one or more devices of the sensor network 102 (and/or the sensor network 104).

For example, the service metadata 130 may include a service behavior description, or technical constraints of the service. For example, technical constraints may include a required CPU type or speed, an amount of (free) memory that is needed, a type or speed of connection that is required or preferred, an operating system version/name/description, or a type or status of a battery or other device power source(s). With respect to the service metadata 130, distinctions may be made between static and dynamic service requirements, such as hardware requirements. For example, a static value such as a total memory or maximum processing speed may be included, along with dynamic values such as available memory/processing/power, and/or a number or type of other services that may be allowed to concurrently run on a device together with the service(s) in question, at an execution time of the service(s).

The system 100 includes a service mapper 132 that is operable, for example, to select at least the device 110 as a selected device from among the plurality of devices 106, 108, and 110 of the sensor network 102, for deploying the service 124 thereon, as shown, e.g., in response to a determination of a specific fault that may be mitigated or cured by deployment of the service 124.

Services executables, such as the service executables 128, may then be deployed onto, in this case, the device 110, using a service injector 134, thereby creating services (or service instances), such as, e.g., the service 124. Once an appropriate service mapping has been performed by the service mapper 132, a service injector 134 may be used to install and start/ activate the mapped service (e.g., the service 116) on the device 104. The service injector 134, more generally, also may be used to manage a life cycle of the service(s), e.g., by performing service updates or stopping the service(s) when necessary.

In determining whether and how to map services from the service repository 126 onto one or more of the devices 106-116, the service mapper 132 may be in communication with a fault manager 136. As described herein, the fault manager 136 may be configured to provide for a structured management of failures or other faults in the system 100, with a high level of extensibility and transparency. Although the fault manager 136 is illustrated in FIG. 1 as being located remote from the networks 102, 104, for providing scalable, centralized fault tolerance, it may be appreciated that in additional or alternative embodiments, a local fault manager 137 may be deployed on the devices of the networks 102, 104, such as on the device 110, as shown.

The fault manager 136 may include a fault diagnosis manager 138 that may be configured to detect and determine a fault within the system 100. As described herein, such a fault may occur, for example, within one of the (devices of the) networks 102, 104, or may occur during a routing of messages within the networks 102, 104, and/or from the networks 102, 104 to the business application(s) 118, or may occur elsewhere within the system 100. For example, as described in more detail herein, the fault diagnosis manager 138 may analyze a time of occurrence of a potential failure, hardware information related to the devices of the network(s) 102, 104, sensor readings received from the devices of the network(s) 102, 104, or other potentially fault-relevant information.

A fault recovery manager 139 may be configured to provide for a mitigation, cure, or other recovery from the fault(s) detected by the fault diagnosis manager 138. For example, if the fault diagnosis manager 138 diagnoses that a fault has occurred at the device 110 (e.g., a fire or some other external factor has destroyed the device 110), then fault recovery may proceed with deployment or redeployment of the service 124, or a similar service, to another device of the network 102 (e.g., using the service mapper 132 and related functionality). In this way, for example, an availability and reliability of the network 102 as a whole may be improved.

The fault manager 136 may be implemented, for example, as a server component that is continuously running and monitoring some number of networks of nodes/devices (shown in FIG. 1 as sensor networks 102, 104, but potentially including other numbers or types of networks), where the devices may potentially communicate with one another wirelessly. In so doing, the fault manager 136 may, for example, communicate with the business application 118 in order to ensure that the business application 118 is acting on information that has not been distorted by the presence of a fault(s), or may communicate with the business application 118 to determine whether the fault may have occurred therein.

In the example of FIG. 1, the fault manager 136 receives messages from the sensor networks 102 and 104, and constructs and maintains a state model 140, e.g., a representation of events/messages within the system 100 and related state information. These stored events/messages within the state model 140 may be supplemented with, or enhanced by, information associated with a device manager 141, which stores information related to hardware or other device characteristics associated with devices of the networks 102, 104. The state model 140 and/or the device manager 141 may include or communicate with, for example, a data structure(s) using a certain ontology and/or schema. For example, the device manager 141 may construct or provide a description of various technical capabilities of the devices 106-116, provided in an eXtensible Markup Language (XML)-based language, e.g., according to a defined XML schema. Of course, other formats, languages, structures, and/or protocols may be used, as well.

More generally, data stored by the device manager 141 may include, for example, a number and/or identifier of each device in the network(s) 102, 104, the remaining battery power of a device, the most-recently read sensor values, a current error rate over a communication channel, a list of services currently installed on each device, or data that was previously stored on a given device. As further examples, the device manager 141 and/or the state model 140 also may include a device description, a software description, a hardware description, or a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of the CPU 120 (e.g., name or speed), memory 122 (e.g., type and total amount of memory), or connection capabilities (e.g., connection speed or connection type) of the device(s). The device status may include more volatile information, including a device location, current CPU usage, or remaining memory. If a device fails to communicate with, or report to, the fault manager 136 after a period of time, then a device status of that device may be changed to disconnected. Other device or service information may be included in, or accessible by, the device manager 141 and/or the state model 140, as would be apparent, and all such information may be referred to as, or may include the terms, device metadata, device characteristics and/or device capabilities.

The state model 140, as referenced above, may store information about events (e.g., sensor readings from the device 110) or other messages (e.g., a message from the device 110 regarding its own availability or the availability of other devices 106, 108). The state model 140 also may represent or include network metadata, which may include, for example, various network parameters, particularly where such parameters are dynamic and not necessarily discernable from information about any single device. One such example of such network metadata may include available bandwidth on the sensor network 102 (or 104). Other examples may include location information, mobility characteristics of the network(s) as a whole, and reliability of network connections.

In the example of FIG. 1, the state model 140 is illustrated as a component of the fault manager 136, while the device manager 141 is illustrated separately. However, this example is merely for the sake of illustration, and it may be appreciated that the device manager 141 may be implemented as a component of the fault manager 136, or, conversely, the state model 140 may be constructed independently of the fault manager 136 (buy may be in communication therewith to provide information desired by the fault manager 136).

The fault manager 136, as described above, may be implemented as a server component, which may expose a standard, discoverable interface(s) 142, e.g., to the business application 118 and/or the service mapper 132. For example, as illustrated in FIG. 1, the business application 118 actually may include a number of different business applications, such as those referenced above, or others.

Thus, for example, the interface 142 may be implemented as a Web service (and associated Web service interface). That is, a Web service refers generally to a software application that provides functionality and data according to a defined interface that governs and defines interactions between the Web service and the, in this case, business application 118. Such a Web service may be discovered by the business application 118 by way of a directory of services, such as, for example, the Universal Description, Discovery, and Integration (UDDI) directory, a distributed directory or registry designed to allow parties to find a given service/functionality on a network. The UDDI uses a language known as the Web Services Description Language (WSDL), which is an XML-formatted language designed to describe capabilities of the web services in a way that allows requesting business application 118 to take advantage of those capabilities. Messages to/from such a Web service may be wrapped in a Simple Object Access Protocol (SOAP) envelope, and sent using Hypertext Transfer Protocol (HTTP). Of course, other types of interfaces may be used, such as, for example, the Common Object Request Broker Architecture (CORBA), and/or other techniques for defining or implementing Application Program Interfaces (APIs) for inter-application and/or service-oriented communications.

As referenced above, in FIG. 1, the sensor networks 102 and 104 may each implement a different communications protocol that is used by the devices 106-110 and 112-116 to communicate with one another within their respective networks. For example, the sensor networks 102, 104 may use one or more communications protocols such as, for example, ConCom (AwareCon), Zigbee, Data Collection Protocol (DCP), Universal-Plug-n-Play (UPnP), and/or various other protocols. Further, for example, the sensor network 102 may implement services in the context of a specific platform, e.g., a Java platform (e.g., Java 2 Micro Edition (J2ME)), so that a communications protocol of the sensor network 102 may be platform-dependent, and may not be (fully) inter-operable with a platform of the sensor network 104, which may be, for example, a C/C++ based platform.

To maintain the state model 140 in a current, up-to-date form, the fault manager 136 may use state information (e.g., events/messages) originating from, e.g., the devices 106-110. As referenced above, it may be the case that the fault manager 136 cannot directly communicate with any of the devices 106-110, since, e.g., the fault manager 136 may not understand the communications protocol of the sensor network 102. Accordingly, protocol translation may be implemented, e.g., as described herein.

For example, a message bridge 143 may be used to allow sending and receiving messages to/from the sensor network 102 in the proprietary, platform-dependent format thereof. Operation of the message bridge 143 is described in more detail below, but, generally speaking, the message bridge 143 may be configured to encapsulate messages in the proprietary, platform-dependent protocol of the sensor network 102, into a format compatible with a standard interface and/or connection that is shared with a native message handler 144. For example, the message bridge 143 and the native message handler 144 may share an Ethernet or serial connection.

The message bridge 143 may be implemented as a piece of hardware (e.g., a base station) within a physical vicinity (e.g., within a transmission range and/or within a defined distance of the devices 106-110) of the sensor network 102. For example, the message bridge 143 may be attached to a personal computer (PC) using a serial port, or using a standard wireless connection (e.g., Wireless Local Area Network (WLAN)), and the PC may be used to broadcast the message to the native message handler 144, e.g., over a wired LAN.

The native message handler 144 may be implemented on a personal computer (PC), such as, for example, a computer

145. In FIG. 1, the computer 145 is illustrated as running virtually an entire middleware system for facilitating communications between, monitoring of, and use of, the sensor networks 102, 104 by the business application(s) 118. Of course, it should be understood that such an example is merely a conceptualization or illustration, and that some or all of the elements of the computer 145 may be executed on different computers, including server computers, workstations, desktop computers, laptop computers, personal digital assistants (PDAs), or mobile phones. For example, as just mentioned, the message bridge 143 may forward encapsulated packets from the sensor network 102 to the native message handler 144, and the message bridge 143 may run on the computer 145 itself, or may be configured to communicate with the computer 145 to exchange messages with the native message handler 144 running thereon.

Meanwhile, the sensor network 104 may be associated with a service gateway 146. The service gateway 146 may be configured to provide a proxy for each of the devices 112-116, and/or for each of the services running on each of the devices 112-116. The service gateway 146 may be configured to provide each such proxy for providing network-related data associated with the devices 112-116, so that a gateway message handler 148 may easily be configured to provide the network-related data in a standard form to the fault manager 136, by, for example, determining the network-related data from the proxies of the service gateway 146 (rather than querying the devices 112-116 116 and respective services themselves, as is done by the native message handler 144 and the message bridge 142).

Implementations and instances of the native message handler 144 and the message bridge 143 may thus be constructed and used for each situation in which a sensor network uses a different proprietary, platform-dependent protocol, and for which no other solution may exist for integrating the sensor networks 102, 104, or other networks. In contrast, for the service gateway 146 and the gateway message handler 148, only one gateway message handler 148 may be needed for any platform that offers the service gateway 146. For example, a second service gateway may be associated with another sensor network (not shown in FIG. 1), and may expose proxies to the gateway message handler 148 in the same service-oriented way as the service gateway 146, using an interface of the gateway message handler 148.

Thus, the message handlers 144, 148 provide a layer of abstraction for the hardware of their respective sensor networks 102, 104. Accordingly, any service or component communicating with the message handlers 144, 148 may only need to be aware of a single (type of) interface, i.e., the interfaces of the message handlers 144, 148, and may use a common or standard protocol to communicate with the message handlers 144, 148. In this way, for example, the fault manager 136 may interact with a number of sensor networks, even if the sensor networks are using a number of different hardware and/or software environments, and may only need to be aware of the common or standard communications protocol(s) and related interfaces.

For example, the first sensor network 102 may be associated with a platform that allows for high-speed data transmission of network-related data associated with the sensor network 102. However, such a platform may suffer from quickly-depleting battery/power resources. Meanwhile, the sensor network 104 may be configured to operate with a minimum of power, but may not be configured for a high degree of mobility (e.g., is not able to easily allow addition or removal of the devices 112-116, or other devices). In other words, it may be the case that no network platform exists or is implemented that may provide every desired feature or capability for a desired application. Thus, it may be the case that different network platforms, particularly given a typical resource-constrained environment of the sensor networks 102, 104, may be required. In this way, for example, the message handlers 144 and 148 (and associated message bridge 143 and the service gateway 146) essentially allow the fault manager 136 to act as if only one communications protocol (and network platform) exists, e.g., with respect to diagnosing, and recovering from, faults. This is true even though, as shown, the native message handler 144 actually may represent a plurality of native message handlers, i.e., one for each different communication protocol that may be implemented by a number of sensor networks.

As just described above, the structure of the system 100 allows the fault manager 136 to communicate with, e.g., to query and to receive updates from, a number of different sensor networks (including, but not limited to, the sensor networks 102, 104), as if all of the different sensor networks were, for practical purposes of the fault manager 136, running the same communications protocol(s) on the same hardware and software platform(s).

A message transport system 150 may be configured to transport messages and/or events from each message handler 144, 148 to the appropriate system monitor(s) 136, and that is also configured to transport messages (e.g., invocations) from one or more of the system monitors 136 to a specified one (or more) of the sensor networks 102, 104. For example, the message transport system 150 may be implemented as a content-based messaging system, that is configured to analyze messages and determine a source and/or destination thereof based on a content of the messages, and may operate using the common or standard communication protocol(s) referenced above.

For example, several of the business applications 118 may be interested in temperature measurements detected by one or more of the sensor networks 102, 104. For instance, one or more of the business applications may be associated with food safety, or with hazardous materials/chemicals safety, and the service 124 may be a temperature-detection service. Then, when the native message handler 144 receives messages from the message bridge 143, the native message handler 144 may encapsulate the messages for forwarding to the message transport system 150 over an appropriate interface. The message transport system 150 may analyze the contents of the messages, to determine, e.g., that measurements in degrees Celsius (or other temperature-related parameters) are included. The message transport system 150 may forward the messages to the fault manager 136, which may implement various algorithms for determining whether a fault may be associated with the temperature measurement (e.g., if the temperature measurement is outside of some physically-possible range), and whether and how fault recovery may occur (e.g., by deploying a new temperature-detection service to the appropriate device).

Figure 2:
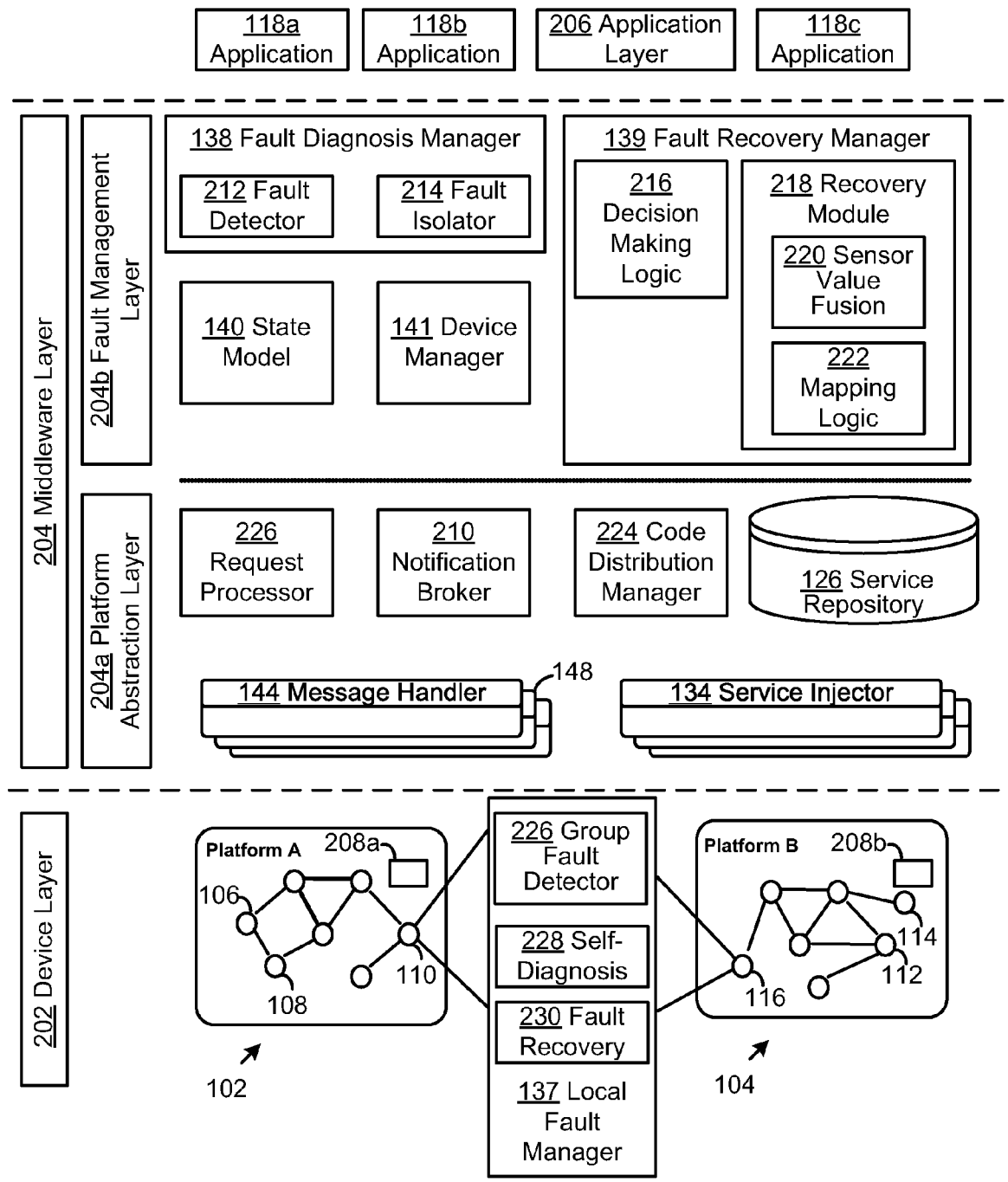
FIG. 2 is a block diagram illustrating a multi-layer fault tolerance framework for implementing the system of FIG. 1.

FIG. 2 is a block diagram of a system 200 illustrating additional or alternative implementations of the system 100 of FIG. 1. In the example of FIG. 2, an example implementation of the system 100 of FIG. is illustrated as including a device layer 202, a middleware layer 204, and an application layer 206. As shown, the middleware layer 204 may include a platform abstraction layer 204*a* and a fault management layer 204*b*, which, as may be appreciated from the above description of FIG. 1 and from the below description, allows for the implementation of different techniques for fault tolerance despite the diversity of hardware platforms that may be used within the system 200. Also, although the example of FIG. 1 is not specifically illustrated as including the referenced layers, it may be appreciated that the system 100 also may implement the layers 202-206, or similar layers, using analogous hardware/software as described above.

In the device layer 202 of FIG. 2, and as referenced above, different sensor networks 102, 104 may implement corresponding platforms (with corresponding communications protocols) and may operate to provide substantially constant information such as sensor readings or events related to business application(s) 118. At the application layer 206, business applications 118a, 118b, 118c represent applications that may make use of the data and other functionality provided by the networks 102, 104, as described herein As just described, the middleware layer 204 may include sublayers including the platform abstraction layer 204a and the fault management layer 204b. In FIG. 2, the layer 204a provides mechanisms for coupling heterogeneous networks with the application layer 206, and the fault management layer 204b detects, diagnoses, and recovers failures associated with (but not necessarily occurring in) the networks 102, 104. As may be appreciated from the description of the interface 142 above, the fault diagnosis manager 138 and the fault recovery manager 139, as well as potentially all other components or subcomponents in the middleware layer 204 may provide or include a Web Service interface to help ensure transparency and extensibility of the system 200.

More generally, the framework of the system 200 provides a number of advantages for fault tolerance. For example, the just-referenced extensibility of the framework allows new techniques and approaches to be easily integrated. The transparency provided by the platform abstraction layer 204a and fault management layer 204b allows for business applications 118 to be unconcerned with fault tolerance techniques being used, or with a level of diversification of hardware platforms. Similarly, as already described, the framework supports easy and reliable integration of different hardware platforms (as may occur, for example, when a single customer purchases different devices or sensor networks from different vendors). The framework of the system 200 also provides for the identification of faults including crashes, omission of required data, and arbitrary failures, in a manner that does not require additional network traffic (and associated consumption of resources) within the sensor networks 102, 104.

Further advantages, as described herein, relate to an ability of the system 200 to isolate faults, e.g., to determine not just that a failure has occurred, but also to automatically identify causes of these failures (for example, for failure to receive data from the network 102, fault isolation may determine that the cause of this fault may be one or more of a hardware failure of a transmitting device, a software failure of the deployed service on the transmitting device, or a routing failure associated with transmitting the desired data from the transmitting device). By determining the cause of the fault in this manner, it may be possible to automatically recover from the fault, e.g., by re-deploying a service to the malfunctioning device, or to a nearby device.

In the system 200, the message handlers 144, 148 of FIG. 1 are illustrated as being included in the platform abstraction layer 204a and may receive messages or other events from either the sensor network 102 having "platform A" or from the sensor network 104 having "platform B," as shown. Local devices 208a and 208b, respectively, may function as local sinks for data from the sensor networks 102, 104, and may be responsible for forwarding messages from or about the networks 102, 104 to the appropriate message handler 144, 148.

Upon receipt of the messages and subsequent translation thereof into the common communications protocol, the message handlers 144, 148 may forward the messages to a notification broker 210, e.g., as part of the message transport system 150 of FIG. 1. The notification broker 210 may follow the web services specification WSBrokeredNotification, and may be configured to receive such events and/or messages, and to forward (e.g., publish) the messages based on, e.g., a content of the messages and on a subscription profile of other components of the system 200. For example, the messages may relate to topics associated with a subscription of the state model 140, the fault diagnosis manager 138, and/or the business application 118.

For example, as just referenced, the notification broker 210 may be considered to be a component of the message transport system 150, and may forward notification messages, in a generic event format using the common communications protocol to the appropriate destination(s), based on a content of the message(s), e.g., relative to an event that caused the message and/or to a topic of which the message is a part. For example, similarly to the examples above, the sensor network 102 may generate a temperature detection message (e.g., providing information that a temperature exceeds a desired maximum value), and may generate a message that is ultimately forwarded to the (native) message handler 144 and then to the notification broker 210.

Based on a content of the event, the notification broker 206 may determine one or more subscribers to a topic associated with the event. For example, the state model 140 may subscribe to the topic "temperature-related events" or to the topic of "all messages from the sensor network 102," and may thus receive the relevant messages for use in updating the state model 140 accordingly.

The fault management layer 204b may primarily serve to diagnose faults, determine a cause of the faults, and recover from the faults if possible. In so doing, the fault diagnosis manager 138 may include a fault detector 212 that is configured to communicate with the state model 140 and to detect or otherwise determine a fault therefrom. A fault isolator 214, as referenced above, may be configured to isolate or otherwise determine a reason for, or cause of, the fault associated with the appropriate sensor network(s).

For instance, the fault detector 212 may identify outlier readings from a sensor node. Then, the fault isolator 214, based on this information and possibly on additional inputs (e.g., from the device manager 141), may determine that there is a loose connection of the sensor to its corresponding node.

Results of the fault isolator 214 may be forwarded to the fault recovery manager 139, e.g., to decision making logic 216, which may be responsible for evaluating which action(s), if any, may be needed to recover the failure. In some example implementations, the decision making logic 216 may trigger a workflow that may represent or include manual operations such as sending a technician to the field to repair or replace a problematic hardware component. In other example implementations, the decision making logic may cause a restructuring of a routing of messages within or between the sensor network(s) 102, 104 and the business application(s) 118.

Although these and other fault recovery techniques are possible, FIG. 2 illustrates a recovery module 218 that includes a sensor value fusion block 220 and mapping logic 222. The sensor value fusion block 220 may act to recover faults, e.g., by fusing or combining (e.g., averaging) similar outputs of the same or similar sensors, so as to minimize the effect of a single non-performing sensor. The mapping logic 222 may perform a mapping function to determine whether any other nodes exist which may take over the faulty functionality determined by the fault diagnosis manager 138, and, if so, whether such nodes are currently configured to, and capable of, receiving a replacement/recovery service selected to mitigate or compensate for the determined fault. Then, a code distribution manager 224 may be responsible for obtaining the determined executable from the service repository 126.

Thus, the mapping logic 222 and the code distribution manager 224 may be viewed as part of the service mapper 132 of FIG. 1, with their respective functionalities separated in FIG. 2 to illustrate inclusion in the different layers 204b and 204a, as shown. That is, the code distribution manager 224 is responsible for selecting and communicating with an appropriate one of the service injector(s) 134, each of which may be responsible for translating transmissions from the common protocol to a protocol used by the sensor network to which the desired service will be deployed/injected. That is, in what is essentially a reverse operation of the message handlers 144, 148, the service injector 134 may represent a plurality of service injectors, each of which is associated with a protocol used by at least one of the sensor networks 102, 104, and each of which may be responsible for forwarding their payload(s) to a corresponding one of the sensor networks 102, 104. Thus, again, transparency is maintained for the application layer 206 in communicating with the sensor networks 102, 104.

As referenced with respect to FIG. 1, the local fault manager 137 may implement some or all of similar or the same functionality as the fault manager 136, but in the context of one or more devices of the sensor networks 102, 104. For example, in-network fault detection algorithms may be applied, e.g., by a group fault detector 226, in which the group fault detector 226 uses the idea of collaboration between nodes of the sensor network 102, e.g., to identify outlier readings and/or crash failures. In addition, nodes can perform self-diagnosis, e.g., using self-diagnosis module 228, to identify possible failures such as impossible readings (e.g. humidity above 100%) and imminent battery failures. Then, fault recovery techniques may be applied at the device layer, such as sensor fusion techniques or election of a new leader for a group of devices/nodes in question.

In some implementations, the local fault manager 137 may forward fault-related messages to a corresponding message handler and thus to the notification broker 210. In this case, the message(s) may then be forwarded directly to the fault isolator 214, since fault detection already may have been performed at the device layer 202.

Finally in FIG. 2, a request processor 226 may be configured to facilitate requests, e.g., from the application layer 206 or from the fault management layer 204b, of one or more of the devices of the sensor networks 102, 104. For example, the application 118b may request an increased frequency of temperature readings, which the request processor 226 may forward to an appropriate message handler for translation and forwarding to the necessary sensor network and desired device thereof. In some implementations, the request processor 226 may include one or more buffers that may facilitate asynchronous invocations, which may be useful, for example, when one or more of the nodes of the sensor networks 102, 104 may be out of contact (e.g., out of transmission range) for some period of time.

Figure 3:
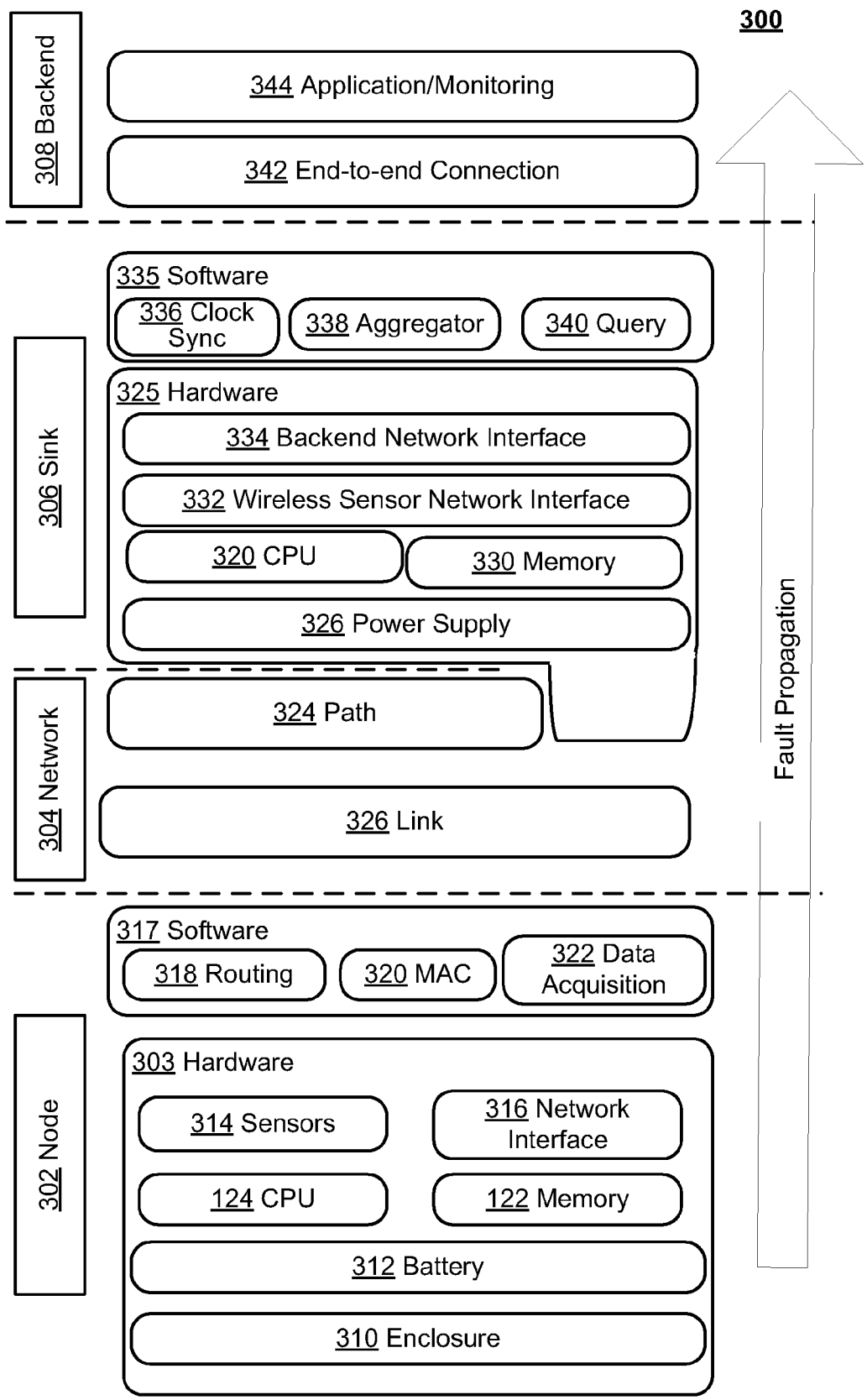
FIG. 3 is a block diagram illustrating examples of fault propagation that may occur in the systems of FIGS. 1 and/or 2.

FIG. 3 is a block diagram 300 illustrating examples of fault propagation that may occur in the systems of FIGS. 1 and/or 2. FIG. 3 illustrates four layers 302, 304, 306, 308 that may be defined along a path of fault propagation. For example, the layer 302 at a node or device level may include hardware 303 representing or including an enclosure (e.g., casing or cover) for a device, along with a battery 312 or other power source, the CPU 124 and the memory 122 already described, as well as the actual sensors 214 to collect measurements and necessary network interfaces to communicate with the network layer 304. Meanwhile, software 317 may include routing information 318, e.g., a routing tree for forwarding messages to the network layer, as well as information regarding a media access control (MAC) address of the corresponding node, and also a data acquisition model 322 that works with the sensor (s) 314 to collect sensed data.

The network layer 304 includes a link 326 and a path 324 associated with routing messages from the node(s) 302 to the sink layer 306. For example, a message from the device 108 may be routed first to the device 110 and then to the message bridge 143 (e.g., the sink 208a of FIG. 2). The network layer 304 manages links between the devices and defines the path, e.g., in accordance with the routing information 318 of the node layer 302.

Then in the sink layer 306, hardware components may include a CPU 328, memory 330, and power supply 326, along with a wireless sensor network interface 332 and a backend network interface 334 for communicating with, for example, the sensor network nodes or with the backend layer 308. Software at the sink may include a clock synchronizer 336 for coordinating clocks between, e.g., the sink 204a and each of the devices of the sensor network 102. Aggregator 338 may aggregate readings from multiple ones of the sensor network nodes/devices, and also may include a query module 340 to forward queries to the networks 102, 104, e.g., related to a current location or status of the queried devices. Finally in FIG. 3, the backend layer 308 may include applications 344, which may represent an application for monitoring and presenting collected data to a user, e.g., by way of a graphical user interface, or other back-end applications (including the business application(s) 118), as well as an end-to-end connection between the back-end and the sensor network device(s).

Thus, from FIG. 3 it may be appreciated that faults may occur at virtually any layer of the system 300, and typically thereafter may propagate toward the backend layer 308. For example, Wireless sensor networks are often deployed in harsh environments, so that the various hardware 303 and software 317 components may each produce a corresponding type of fault. For example, the enclosure 310 may suffer mechanical stress, or have contact with water or fire, or may include exposed electronic parts such as antennas. Further, software bugs or other malfunctions or wrong sensor readings due to low battery power may occur that will cause the node to not behave as expected.

At the network Layer 304, routing-related faults may lead to dropped or misguided messages, collision of messages, or unacceptable delays. In other situations, however, nodes may have suitable link connections but nonetheless the messages may not be delivered to their destination due to path errors. In particular, a software bug in the routing layer may result in circular paths, or delivery of messages to the incorrect destination. As another example, in scenarios where the nodes have a certain degree of mobility the nodes might go to a region which is out of range.

At the sink layer 306, the device (sink) collecting data from the network for propagation thereof to the back end (e.g., the devices 208a, 208b) is subject to faults of its components, such as those components illustrated and described above. For example, with reference to the power supply 326, the sink may be deployed in areas where no permanent power supply is present. In such applications, batteries together with solar cells may be used to provide the amount of energy necessary. In these applications the sink is subject to battery failures, e.g., due to natural material such as snow covering the power cells, or may become unreachable as a consequence of bad weather or other natural phenomenon.

Finally in FIG. 3, if the back-end layer 308 suffers a fault, e.g., if the application 344 suffers a fault due to a software malfunction or hardware failure, then the entire system may be considered faulty. For example, even if all sensor data is collected and transmitted properly, failure of the application 344 to present this collected data correctly may render the system unsuitable for its intended purpose as far as a user (not shown in FIG. 3) is concerned.

Thus, it may be appreciated that the framework(s) of FIGS. 1 and 2 provide for a reduction of the threat of failures being propagated to upper layers of the system, since failures at the lower levels may be detected, isolated, and corrected before such propagation may occur. Further, even for errors that occur and propagate to higher layers, the framework(s) of FIGS. 1 and 2 may serve to reduce the chances of this same error happening frequently.

Figure 4:
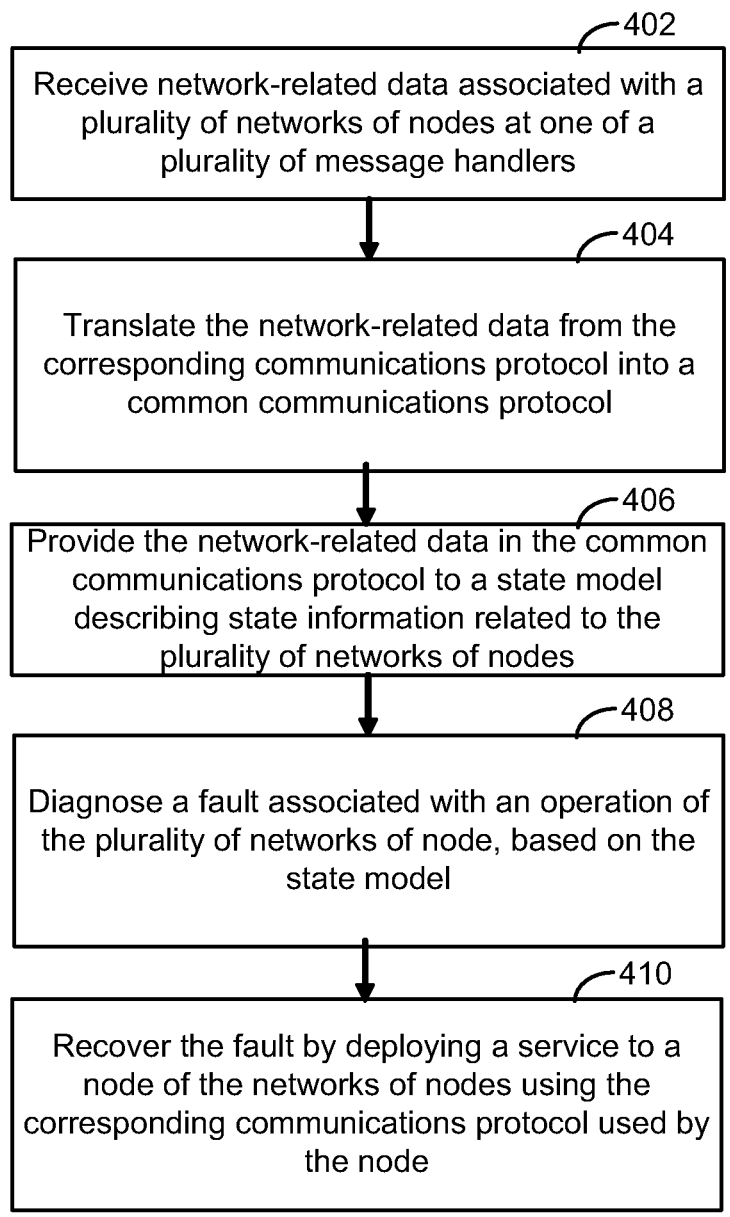
FIG. 4 is a flowchart illustrating first example operations of the systems of FIGS. 1-3.

FIG. 4 is a flowchart 400 illustrating first example operations of the systems of FIGS. 1-2. In the example of FIG. 4, network-related data associated with a plurality of networks of nodes may be received at one of a plurality of message handlers (402). The plurality of message handlers each may be associated with a corresponding network of nodes and a corresponding communications protocol that is used by the corresponding network of nodes. For example, as described and illustrated with respect to FIG. 1, the message handlers 144, 148 may receive messages from the sensor networks 102, 104, respectively.

The network-related data may be translated from the corresponding communications protocol into a common communications protocol (404). For example, the message handlers 144, 148 may translate the messages from the first and second communications protocols, respectively, into the common communications protocol that is understood by the message transport system 150 (e.g., the notification broker 210).

The network-related data in the common communications protocol may be provided to a state model describing state information related to the plurality of networks of nodes (406). For example, the notification broker may publish the messages received from the message handlers 144, 148 to the state model 140.

A fault associated with an operation of the plurality of networks of nodes may be diagnosed, based on the state model (408). For example, the fault diagnosis manager 138 may query or otherwise communicate with the state model 140 (and possibly the device manager 141 or other components) to obtain sufficient information to determine whether a fault has occurred (e.g., that an erroneous temperature reading has been obtained as opposed to an unexpected one). More specifically, the fault detector 312 may analyze the messages/events in the state model to detect a presence of a fault, while the fault isolator 314 may then isolate a cause or origination of the fault.

The fault may be recovered by deploying a service to a node of the networks of nodes using the corresponding communications protocol used by the node (410). For example, the service mapper 132, and/or the mapping logic 222 and the code distribution manager 224, may determine a service executable from the service repository 126 that is suitable to replace a deployed service that has been diagnosed and isolated as a source of a fault in the system 100/200. Then the service injector 134 may inject this service executable to one or more nodes that are determined by the mapping logic 222 to be suitable for deployment of the determined service.

Figure 5:
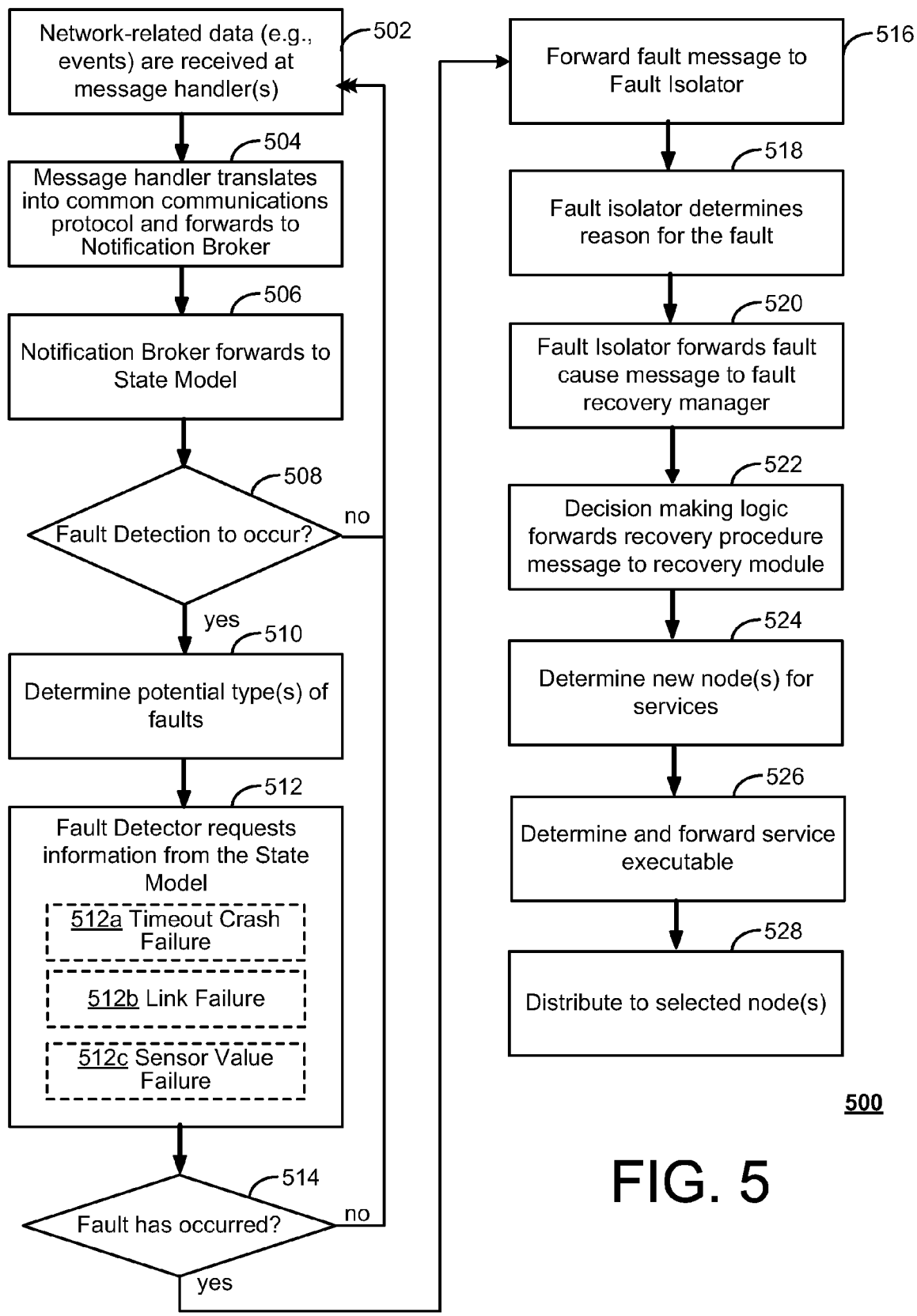
FIG. 5 is a flowchart illustrating second example operations of the system of FIG. 1-3.

FIG. 5 is a flowchart 500 illustrating second example operations of the systems of FIGS. 1-2. In the example of FIG. 5, network-related data, such as messages or other events associated with a network(s) of nodes, may be received at one or more message handlers (502). The message handler(s) may translate the received messages into a common communications protocol for forwarding thereof to the notification broker 210 (504), and the notification broker 210 may then forward (publish) the message(s) to the state model 140 (506).

A determination may be made as to whether fault detection should occur (508). For example, some fault detection algorithms may be scheduled for periodic implementation thereof. In other examples, fault detection may be triggered by some characteristic of the message(s) in the state model, such as an unexpected value or a message received at an unexpected time. If no fault detection is to occur, then the message handlers may simply continue to receive further network-related data (502).

If fault detection is to occur (508), then potential types of faults to be detected may be determined (510). For example, different fault types may be checked for periodically. In other examples, information in the state model may trigger the fault detector 212 to check for particular types of faults.

The fault detector 212 may then request information from the state model 140 (512). That is, as referenced above, the wireless sensor networks may propagate their messages/events to the message handlers 144, 148, as described herein. A format of these messages may depend on the hardware platform, but in general may contain detected sensor readings, an identifier for the transmitting node/device, and a timestamp for each message/event. Of course, additional information may also be available according to the application running on the node. When forwarded to the notification broker 210 for subsequent publishing to subscribing components (e.g., the state model 140), the messages may contain the sensor readings, node identifier, and timestamp, as well as information about a hardware platform of the originating sensor network. Thus, at least this information may be available to the fault detector 212.

Thus, the fault detector 212 may request different data from the state model, according to the type of failure being analyzed. For example, for a time-out crash failure (512a), the fault detector 212 may request a timestamp of the last event sent by the relevant node or group of nodes. For a link failure (512b), the fault detector 212 may request a time difference between the messages sent by each node. For a sensor value failure (512c), sensor readings and timestamps from nodes within the period analyzed may be received.

The fault detector 212 may then determine that a fault has occurred (514) (otherwise, receipt of network-related data may continue (502)). If so, then the fault detector 212 may forward a fault message to the fault isolator 214 (516) to determine a cause of the failure. This fault message may contain a fault appearance time, a type of fault, node identifiers, and information related to the relevant hardware platform(s).

Depending, for example, on content of the different fault detection signals, the fault isolator 214 may apply isolation techniques including, e.g., binary decision trees or rules, to indicate the reason for the fault (518). Once the reason is isolated, then the fault isolator 214 may forward the message related to the cause of the fault to the fault recovery manager 139 (520), e.g., to the decision making logic 216. This message may contain a type of failure, a reason for the failure, a place of the failure, and a time of appearance of the fault.

The decision making logic 216 may receive the message from the fault isolator 214 and may determine a fault recovery procedure for forwarding to the recovery module 218 (522). As referenced herein, multiple options are possible for the recovery module 218 to perform recovery. For example, a manual workflow may be initiated to correct or repair sensors or other device hardware. Or, fusion of sensor values may occur to mitigate potential sensor value errors. In the example of FIG. 5, it may be assumed that the detected and isolated fault may be associated with a deployed service within the network(s) of nodes, whereupon the decision making logic 216 may forward a message to the recovery module 218 (e.g., to the mapping logic 222) that may include a specified recovery technique, an identifier for the source of the failure (e.g., one or more nodes, or hardware/software thereof), as well as a recovery target (e.g., a desired sensor reading and service name of a service that may be (re)deployed to the sensor network(s) 102, 104.

The mapping logic 222 may determine a new node (perhaps using the device manager 141) on which to deploy a new service (524) that may be determined to operate in a manner to mitigate or eliminate the previously-diagnosed fault. This technique may seek to maintain a number of instances of a service running in the network. Once the node is selected, the mapping logic 222 may send this information to the code distribution manager 224, including the information of an identifier of the target node, a relevant hardware platform and associated communications protocol used by the relevant sensor network, and service identifiers associated with the service to be deployed.

The code distribution manager 224 may then determine and request the desired service executable from the service repository 126 (526), based on a service identifier of the desired service, as well as based on information about the relevant hardware platform of the network in question. Finally in FIG. 5, the code distribution manager 224 may select the correct service injector 134 and indicate (in a corresponding message) which services should be deployed in each node. This message may contain, e.g., node identifiers, relevant hardware platforms, a service identifier, and a distribution method, as well as the executable service (or a reference thereto). The service executable may thus be distributed within the wireless sensor network. The format of the messages and the content may depend on the hardware platform and on the method chosen.

It may be appreciated that such detection of faults as just described with respect to FIG. 5 may be performed either with the aid of the back-end through the fault detector 212, and/or in the device layer 202. The wireless sensor networks themselves may monitor the nodes' condition, e.g. using the local fault manager 137 as described herein, which may then send the fault detection events to the middleware layer 204. These messages/events may contain a type of fault detected, the node identifier, and the appearance time of the faults. In these examples, the message handler(s) may receive the messages, may add the corresponding hardware information, and may forward the message to the notification broker 210. If fault detection has already occurred at the local fault manager 137, then the notification broker 210 may forward the message(s) directly to the fault isolator 214.

Although many of the examples provided herein relate to business applications or settings, it may be appreciated that these examples are for the sake of illustration only, and that the present description is applicable in a wide variety of settings. For example, the described features may be implemented in the context of scientific studies (e.g., sensor networks deployed to study environmental conditions), or may be implemented for personal or governmental use. Other implementations and uses would also be apparent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system including instructions recorded on a non-transitory computer-readable storage medium and executable by at least one processor, the system comprising:
   the at least one processor;
   a first message handler configured to cause the at least one processor to receive first network-related data using a first communications protocol, the first network-related data being associated with a first network of nodes, the nodes of the first network of nodes communicating with one another within the first network using the first communications protocol;
   a second message handler configured to cause the at least one processor to receive second network-related data using a second communications protocol, the second network-related data being associated with a second network of nodes, the nodes of the second network of nodes communicating with one another within the second network using the second communications protocol;
   a message transport system configured to cause the at least one processor to receive the first network-related data and the second network-related data and further configured to route the first network-related data and the second network-related data in a common communications protocol; and
   a fault manager configured to:
      construct and maintain a state model that stores events occurring in the first network of nodes and the second network of nodes, stores related state information, and stores network metadata for the first network of nodes and the second network of nodes,
      cause the at least one processor to receive the network-related data in the common communications protocol, and
      determine a fault associated with an operation of one or more of the first network of nodes and the second network of nodes, based on the network-related data in the common protocol and on the state model,
      cause the at least one processor to determine a recovery method for recovering an operation of the networks of nodes despite the fault, the recovery method being determined from among a plurality of recovery methods including one or more of triggering a workflow, performing a sensor value fusion, and deploying a service within a node of the networks of nodes; and
      cause the at least one processor to implement the determined recovery method; and
   a code distribution manager configured to determine a target node not associated with the fault within the first network of nodes and to determine a service executable for deploying a service in response to the fault and based on a mapping of the service to the target node as part of implementing the determined recovery method when the recovery method includes deploying a service; and
   a service injector configured to deploy the service executable to the target node for continued execution thereon to thereby recover the operation, wherein the service injector is selected from a plurality of service injectors as being compatible with the first communications protocol.

2. The system of claim 1 wherein the first message handler comprises:
   a native message handler in communication with a message bridge to receive the first network-related data, the message bridge being in communication with at least one device of the first network of nodes using the first communications protocol,
   wherein the native message handler is configured to translate the first network-related data from the first communications protocol to the common communications protocol.

3. The system of claim 1 wherein the second message handler comprises:
   a gateway message handler in communication with a service gateway to receive the second network-related data, the service gateway being in communication with at least one device of the second network of nodes and being compatible with the second communications protocol,
   wherein the gateway message handler is configured to receive the second network-related data in the common communications protocol from the service gateway for forwarding to the message transport system.

4. The system of claim 1 wherein the message transport system comprises a notification broker configured to publish at least some of the first network-related data and/or the second network-related data using the common communications protocol, for determination of the fault based thereon.

5. The system of claim 1 wherein the message transport system comprises:
   a request processor that is configured to:
      receive a request for additional network-related data,
      select the first network as being configured to provide the additional network-related data, based on a content of the request, and
      forward the request to the first message handler.

6. The system of claim 1 wherein the events stored in the state model include pre-fault events.

7. The system of claim 1 wherein the fault manager includes a fault diagnosis manager configured to determine that an event associated with at least the first network of nodes is associated with the fault.

8. The system of claim 7 wherein the fault diagnosis manager comprises:
   a fault detector configured to determine a type of fault and a fault detection algorithm associated with the type of fault, and to detect the fault based on the fault detection algorithm and the event.

9. The system of claim 8 wherein the fault diagnosis manager comprises:
   a fault isolator configured to receive the detected fault from the fault detector and configured to determine a cause of the fault relative to the networks of nodes.

10. A system including instructions recorded on a non-transitory computer-readable storage medium and executable by at least one processor, the system comprising:
    the at least one processor;
    a middleware layer configured to cause the at least one processor to communicate with a plurality of networks of nodes and configured to cause the at least one processor to communicate with at least one back-end application, the middleware layer including a platform abstraction layer configured to:
cause the at least one processor to receive, from the plurality of networks of nodes, first network-related data using a first communications protocol from a first network of nodes and second network-related data using a second communications protocol from a second network of nodes, wherein the first communications protocol is used by the nodes of the first network for communicating with one another within the first network and the second communications protocol is used by the nodes of the second network for communicating with one another within the second network, and provide the first network-related data and the second network-related data in a common protocol; and a fault management layer configured to:
cause the at least one processor to construct and maintain a state model that stores events occurring in the first network of nodes and the second network of nodes, stores related state information, and stores network metadata for the first network of nodes and the second network of nodes, cause the at least one processor to receive the first network-related data and the second network-related data in the common protocol, and cause the at least one processor to determine a fault associated with an operation of the plurality of networks, based on the network-related data in the common protocol and on the state model, cause the at least one processor to determine a recovery method for responding to the fault, and cause the at least one processor to notify the platform abstraction layer of the recovery method, wherein the platform abstraction layer is further configured to:
cause the at least one processor to determine a target node not associated with the fault within the first network of nodes when the recovery method includes deploying a service, cause the at least one processor to select a service injector from a plurality of service injectors, the selected service injector being compatible with the first communications protocol, and cause the at least one processor to deploy the service, using the selected service injector, to the target node for execution thereon to thereby recover the fault.

11. The system of claim 10 wherein the platform abstraction layer comprises a plurality of message handlers, each message handler being configured to translate a corresponding one of at least the first communications protocol and the second communications protocol into the common protocol.

12. The system of claim 10 wherein the fault management layer comprises:
a fault diagnosis manager configured to determine that an event associated with the operation is associated with the fault, and configured to determine a cause of the fault based in part on the event.

13. A method comprising:
receiving network-related data associated with a plurality of networks of nodes at one of a plurality of message handlers, the plurality of message handlers each associated with a corresponding network of nodes and a corresponding communications protocol that is used by the corresponding network of nodes to conduct in-network communications within and among the corresponding nodes thereof;

translating the network-related data from the corresponding communications protocol into a common communications protocol;

providing the network-related data in the common communications protocol to a state model that stores state information related to the plurality of networks of nodes and network metadata for the plurality of networks of nodes;

diagnosing a fault associated with an operation of the plurality of networks of nodes, based on the state model, the operation being associated with a source node of a first network of nodes within the plurality of networks; and recovering the fault by:
determining a recovery method for recovering the operation despite the fault, determining a target node not associated with the fault within the first network of nodes when the recovery method includes deploying a service, selecting a service injector from a plurality of service injectors, the selected service injector being compatible with a communications protocol corresponding to the source node, and deploying, using the selected service injector, the service to the target node for execution on the target node to recover the fault.

14. The method of claim 13 wherein providing the network-related data in the common communications protocol comprises:
publishing a notification of the network-related data to the state model, based on a content of the network-related data and on a subscription of the state model to the content.

15. The method of claim 13 wherein diagnosing the fault comprises:
determining an event associated with the networks of nodes from the state model;

determining a type of failure; and determining that the event is associated with the type of failure.

16. The system of claim 1, wherein the nodes of the first network of nodes include first sensors, and wherein the nodes of the first network of nodes are configured to execute a first collaborative sensing function using the first communications protocol, and wherein the nodes of the second network of nodes include second sensors, and wherein the nodes of the second network of nodes are configured to execute a second collaborative sensing function using the second communications protocol.

17. The method of claim 15, wherein diagnosing the fault further includes:
requesting additional information from the state model based on the type of failure.

18. The method of claim 17, wherein diagnosing the fault further includes:
determining a fault recovery procedure based on the type of failure, a location of failure, and a time of failure; and identifying the target node as able to assume functionality for the source node.

19. The method of claim 13, wherein recovering the fault further includes:
    identifying the service as a suitable replacement for a service that has been diagnosed as contributing to the fault.

20. The system of claim 10 wherein as part of determining the fault, the fault management layer is further configured to cause the at least one processor to:
    determine a type of failure; and
    request additional information from the state model based on the type of failure.

21. The method of claim 13, wherein diagnosing the fault comprises:
    determining that an event associated with the operation is associated with the fault, and
    determining a cause of the fault based in part on the event.

* * * * *